United States Patent
Yoshida et al.

(10) Patent No.: US 8,014,297 B2
(45) Date of Patent: Sep. 6, 2011

(54) NETWORK TEST APPARATUS, NETWORK TEST METHOD AND NETWORK TEST PROGRAM

(75) Inventors: Eitatsu Yoshida, Fukuoka (JP); Wataru Nakamura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 152 days.

(21) Appl. No.: 12/039,172

(22) Filed: Feb. 28, 2008

(65) Prior Publication Data

US 2008/0219173 A1 Sep. 11, 2008

(30) Foreign Application Priority Data

Mar. 9, 2007 (JP) ................................. 2007-060932

(51) Int. Cl.
*G01R 31/08* (2006.01)
(52) U.S. Cl. .................... 370/241.1; 370/241; 370/242
(58) Field of Classification Search .................. None
See application file for complete search history.

(56) References Cited

U.S. PATENT DOCUMENTS

| | | | |
|---|---|---|---|
| 5,968,124 A | 10/1999 | Takahashi et al. | |
| 7,342,897 B1 * | 3/2008 | Nader et al. | 370/255 |
| 2005/0099954 A1 * | 5/2005 | Mohan et al. | 370/241.1 |
| 2006/0153220 A1 * | 7/2006 | Elie-Dit-Cosaque et al. | 370/432 |

FOREIGN PATENT DOCUMENTS

JP 09-298544 11/1997

OTHER PUBLICATIONS

Ethernet—OAM [online], [searching date Jan. 9, 2007]; internet URL http://itpro.nikkeibp.co.jp/article/COLUMN/20060720/243861/, Jul. 21, 2006 (2 pages) (3 pages of English Translation of the relevant part).
IEEE 802.1ag "Ethernet OAM", "The standard trend of 802.1/802.3" [online][searching date Jan. 9, 2007], internet URL http://wbb.forum.impressrd.jp/report/20060922 , Sep. 25, 2006, (4 pages) (3 pages of English Translation of the relevant part).
Japanese Office Action issued on Apr. 19, 2011 in corresponding Japanese priority application No. 2007-060932. (6 pages) (2 pages English Translation).
Eitatsu Yoshida, et al. "A Technique to Test an Ethernet OAM Corresponding to a Next Generation Network (NGN)", Mar. 7, 2007, The Institute of Electronics, Information and Communication Engineers General Conference, B-6-84. (4 pages) (3 pages English Translation).

* cited by examiner

*Primary Examiner* — Chi H Pham
*Assistant Examiner* — Kouroush Mohebbi
(74) *Attorney, Agent, or Firm* — Staas & Halsey LLP

(57) ABSTRACT

According to an aspect of an embodiment, an apparatus is transmitting/receiving an OAM frame containing kinds of tests indicating one or more tests for Ethernet-OAM to/from a relay apparatus, storing configuration information to generate a network configuration needed for each of the plurality of tests in a pseudo manner, distinguishing the kind of test contained in the relevant OAM frame and obtaining network information of a network to which the relay apparatus that transmitted the OAM frame belongs and obtaining configuration information corresponding to the obtained network information obtained from the stored configuration information.

20 Claims, 38 Drawing Sheets

FIG. 3

| Index | Pin | VLAN ID | Own MEG Level | ME type | Own Mac Addr | Pout | Target Mac Addr | VLAN IDout | MEG ID | MEP ID | impair | chain |
|---|---|---|---|---|---|---|---|---|---|---|---|---|
| 1 | 0 | 1 | 1 | MEP | Own MAC1 | 1 | Tar MAC1 | 10 | A | 1 | – | – |
| 2 | 0 | 2 | 7 | MIP | Own MAC2 | 2 | Tar MAC2 | 20 | – | – | Delay | – |
| 3 | 0 | 3 | 5 | MIP | Own MAC3 | 1 | Tar MAC3 | 30 | – | – | Loss | 4 |
| 4 | 0 | 3 | 5 | MEP | Own MAC4 | 1 | Tar MAC4 | 40 | D | 4 | – | – |
| 5 | 0 | 3 | 5 | MEP | Own MAC5 | 1 | Tar MAC5 | 50 | E | 5 | Loss | – |
| 6 | 1 | 5 | 1 | MIP | Own MAC6 | 4 | Tar MAC6 | 60 | – | – | – | 7 |
| ･･ | ･･ | ･･ | ･･ | ･･ | ･･ | ･･ | ･･ | ･･ | ･･ | ･･ | ･･ | ･･ |
| n | m | N | 0 | MIP | Own MACn | N | Tar MACm | M | XX | YY | Delay | 1 |

FIG. 4

| Defect Status (MEP DETECTING ALERT INFORMATION) | Unexpected MEG Level | Detected/OFF |
| --- | --- | --- |
| | | NUMBER OF ALERT CCM RECEPTIONS |
| | | ALERT CCM LAST RECEIVING TIME |
| | | ALERT DETERMINING INFORMATION (RxFrameLevel) |
| | Mismerge | Detected/OFF |
| | | NUMBER OF ALERT CCM RECEPTIONS |
| | | ALERT CCM LAST RECEIVING TIME |
| | | ALERT DETERMINING INFORMATION (RxFrameMEGID) |
| | Unexpected MEP | Detected/OFF |
| | | NUMBER OF ALERT CCM RECEPTIONS |
| | | ALERT CCM LAST RECEIVING TIME |
| | | ALERT DETERMINING INFORMATION (RxFrameMEPID) |
| | Unexpected Period | Detected/OFF |
| | | NUMBER OF ALERT CCM RECEPTIONS |
| | | ALERT CCM LAST RECEIVING TIME |
| | | ALERT DETERMINING INFORMATION (RxFramePeriod) |
| OTHER MEP INFORMATION | MEP.1 | MONITORED (ON/OFF) |
| | | MONITORED ENTRY AUTO (ON/OFF) |
| | | MEPID |
| | | OTHER MEP MAC ADDRESS |
| | | Status (Normal/LOC/MONITORING OFF) |
| | | NUMBER OF NORMAL CCM RECEPTIONS |
| | | NORMAL CCM LAST RECEIVING TIME |
| | | NORMAL CCM RECEIVING TIME × N |
| | | ACTUAL MEASUREMENT VALUE OF NORMAL CCM RECEIVING CYCLE |
| | | THEORETICAL VALUE OF NORMAL CCM RECEIVING CYCLE (RXFRAME PERIOD VALUE) |
| | MEP.2 | (SAME AS MEP.1) |
| | ... | ... |
| | MEP.n | (SAME AS MEP.1) |

FIG. 5

| TARGET INFORMATION | MEP. 1 | TARGETED (ON/OFF) | |
| --- | --- | --- | --- |
| | | TARGETED ENTRY AUTO (ON/OFF) | |
| | | OTHER MEP MAC ADDRESS | |
| | | LB TRANSMISSION RELATED INFORMATION | RESPONSE RESULT (RESPONSE OK/TIMEOUT) |
| | | | NUMBER OF LBM TRANSMISSIONS |
| | | | LBM TRANSMISSION TIME |
| | | | NUMBER OF LBR RECEPTIONS |
| | | | LBR RECEPTION TIME |
| | | LB RESPONSE RELATED INFORMATION | NUMBER OF LBM RECEPTIONS |
| | | | LBM RECEPTION TIME |
| | | | NUMBER OF LBR RESPONSE TRANSMISSIONS |
| | | | LBR RESPONSE TRANSMISSION TIME |
| | | LT TRANSMISSION RELATED INFORMATION | RESPONSE RESULT (RESPONSE OK/TIMEOUT) |
| | | | NUMBER OF LTM TRANSMISSIONS |
| | | | LTM TRANSMISSION TIME |
| | | | NUMBER OF LTR RECEPTIONS |
| | | | RECEIVED LTR FRAME INFORMATION ×N (TTL, SRCMAC, RECEPTION TIME, ETC.) |
| | | LT RESPONSE/ TRANSFER RELATED INFORMATION | NUMBER OF LTM RECEPTIONS |
| | | | LTM RECEPTION TIME |
| | | | NUMBER OF LTR RESPONSE TRANSMISSIONS |
| | | | LTR RESPONSE TRANSMISSION TIME |
| | | | NUMBER OF LTMT TRANSFERS |
| | | | LTM TRANSFER TIME |
| | | AIS RELATED INFORMATION | NUMBER OF AIS RECEPTIONS |
| | | | AIS RECEPTION TIME |
| | | | NUMBER OF AIS TRANSMISSIONS |
| | | | AIS TRANSMISSION TIME |
| | | LCK RELATED INFORMATION | NUMBER OF LCK RECEPTIONS |
| | | | LCK RECEPTION TIME |
| | | | NUMBER OF LCK TRANSMISSIONS |
| | | | LCK TRANSMISSION TIME |
| | MEP. 2 | (SAME AS MEP. 1) | |
| | ... | ... | |
| | MEP. n | (SAME AS MEP. 1) | |

FIG. 6

| EO frame type (CC,LB,LT,RDI,AIS,LCK) |
|---|
| Msg type(M,R) |
| Rx Port No |
| Rx Time Stamp |

FIG. 7

| Rx Port No |
|---|
| VLAN ID (RxFrameVLANID) |
| MEG Level (RxFrameMEGLevel) |
| Target MAC Addr (RxFrameDstMAC) |

FIG. 8

| ME type (MEP,MIP) |
| --- |
| Tx Port No |
| Target Mac Addr |
| VLAN IDout |
| Own MEG Level |
| MEG-ID |
| MEP-ID |
| Impair |
| Chain |

FIG. 20

| | |
|---|---|
| CC TRANSMISSION | CC TRANSMISSION FLAG (ENABLE/DISABLE) |
| | PERIODIC CC TRANSMISSION TIMER |
| | NUMBER OF CC TRANSMISSIONS |
| | LAST CC TRANSMISSION TIME |
| LB TRANSMISSION | LBM TRANSMISSION FLAG (ENABLE/DISABLE) |
| | NUMBER OF LBM TRANSMISSIONS |
| | NUMBER OF REMAINING LBM TRANSMISSIONS |
| | NUMBER OF EXECUTED LBM TRANSMISSIONS |
| | LAST LBM TRANSMISSION TIME |
| | LBR RECEPTION WAITING TIMER |
| | NUMBER OF LBR RECEPTIONS |
| | LAST LBR RECEPTION TIME |
| | RESPONSE RESULT (RESPONSE OK/TIMEOUT) |
| LB RESPONSE TRANSMISSION | NUMBER OF LBM RECEPTIONS |
| | LAST LBM RECEPTION TIME |
| | NUMBER OF LBR RESPONSE TRANSMISSIONS |
| | LAST LBR RESPONSE TRANSMISSION TIME |
| LT TRANSMISSION | LTM TRANSMISSION FLAG (ENABLE/DISABLE) |
| | NUMBER OF LTM TRANSMISSIONS |
| | NUMBER OF REMAINING LTM TRANSMISSIONS |
| | NUMBER OF EXECUTED LTM TRANSMISSIONS |
| | LAST LTM TRANSMISSION TIME |
| | LTR RECEPTION WAITING TIMER |
| | NUMBER OF LTR RECEPTIONS |
| | RECEIVED LTR FRAME INFORMATION ×N (TTL, SRCMAC, RECEPTION TIME, ETC.) |
| | RESPONSE RESULT (RESPONSE OK/TIMEOUT) |
| LT RESPONSE /TRANSFER TRANSMIT | NUMBER OF LTM RECEPTIONS |
| | LAST LTM RECEPTION TIME |
| | NUMBER OF LTR RESPONSE TRANSMISSIONS |
| | LAST LTR RESPONSE TRANSMISSION TIME |
| | NUMBER OF LTM TRANSFERS |
| | LAST LTM TRANSFER TIME |

FIG. 28

| CUSTOMER (USER)Level : 7, 6, 5 |
|---|
| PROVIDERLevel : 4, 3 |
| OPERATORLevel : 2, 1, 0 |

FIG. 31

|   | 1 | 2 | 3 | 4 |
|---|---|---|---|---|
|   | 8 7 6 5 4 3 2 1 | 8 7 6 5 4 3 2 1 | 8 7 6 5 4 3 2 1 | 8 7 6 5 4 3 2 1 |
| 1 | MACDA | | | |
| 5 | | | MACSA | |
| 9 | | | | |
| 13 | VLAN Tag | | (VLAN ID) | |
| 17 | Ethernet Type | | MEL | Version(0) | OpCode(1) |
| 21 | Flags | TLV Offset(70) | SEQUENCE NUMBER (*) | |
| 25 | SEQUENCE NUMBER (*) | | 000 | MEPID |
| 29 | MEG ID(48byte) | | | |
| 77 | TxFCf(FOR LOSSMEASURE) | | | |
| 81 | RxFCb(FOR LOSSMEASURE) | | | |
| 85 | TxFCb(FOR LOSSMEASURE) | | | |
| 89 | Reserve(0) | | | |
| 93 | END TLV(0) | FCS(4byte) | | |
| 97 | FCS(4byte) | | | |

NETWORK TEST APPARATUS, NETWORK TEST METHOD AND NETWORK TEST PROGRAM

CROSS-REFERENCE TO RELATED APPLICATIONS

This application is related to and claims priority to Japanese patent application no. 2007-60932 filed on Mar. 9, 2007 in the Japan Patent Office, and incorporated by reference herein.

BACKGROUND

1. Field

The embodiments relate to a network test apparatus connected to a relay apparatus being a test object. Particularly, the network test apparatus conducts the plurality of tests by transmitting/receiving Operations Administration Maintenance (OAM) frames containing kinds of the test indicating the respective plurality of tests for Ethernet-OAM to/from the relay apparatus.

2. Description of the Related Art

Conventionally, the Ethernet has been used to construct a LAN (Local Area Network). Recently, communication carriers use the Ethernet to construct a wide-area network such as the WAN (Wide Area Network). For example, a wide-area Ethernet using the layer 2 of the Ethernet is implemented mainly in a Point-to-Point Network or a multipoint-connection Layer 2 Virtual Private Network.

The communication carriers that provide the wide-area Ethernet need to manage and maintain the network itself by sensing defects in a plurality of relay apparatuses (for example, LAN switches) or a line used to construct the wide-area Ethernet. For such management or maintenance, the carriers use SNMP (Simple Network Management Protocol) being a management protocol of TCP/IP (Transmission Control Protocol/Internet Protocol).

Generally, as a technique to maintain and manage various conditions that occur in the layer 2, the Ethernet-OAM (Ethernet-Operations Administration Maintenance) is used. The Ethernet-OAM has been standardized as "Y.1731" (Non-patent Document 1: "Ethernet-OAM", [online], [searched on Jan. 9th, 2007], Retrieved from the Internet: <URL: http://itpro.nikkeibp.co.jp/artice/COLUMN/20060720/243861>) by the ITU-T (International Telecommunication Union Telecommunication-Standardization Sector). IEEE (The Institute of Electrical and Electronics Engineers, Inc) has also proceeded with standards work as the "IEEE802.1ag" (Non-patent Document 2: "802.1/802.3 Standardization Trend", [online], [searched on Jan. 9th, 2007], Retrieved from the Internet: <URL: http://wbb.forum.impressrd.jp/report/20060922/280>).

Describing an overview of the Ethernet-OAM, the Ethernet-OAM is a specification to maintain and manage the various conditions that occur in the layer 2. To use the Ethernet-OAM, an L2 switch used in a subject Ethernet, for example, needs to implement the Ethernet-OAM. Therefore, it is tested whether a relay apparatus such as an L2 switch implements (conforms to) Ethernet-OAM or not for maintenance and management using the Ethernet-OAM in a real environment.

Specifically, as shown in FIG. 27, in the Ethernet-OAM, a managed group is referred to as a MEG (Maintenance Entity Group), a terminating apparatus in a MEG is referred to as a MEP (MEG End Point), a relay apparatus in a MEG is referred to as a MIP (MEG Intermediate Point), and a communication section between two MEPs is referred to as an ME (Maintenance Entity).

The above terms will be described specifically as follows. An ME is a section to conduct various tests using an OAM frame. A MEG is a collection of MEs. For example, in P2P connection, an MEG includes only a single ME. On the contrary, in the case of multipoint connection, an MEG includes a plurality of different MEs. A MEG is assigned with an ID (character string) referred to as a MEGID, which is defined differently by ITU-T and IEEE.

Also, many levels to constrain the operation of a MEP and MIP included in the relevant MEG are defined for a MEG. Specifically, the MEG levels clearly discriminate and separate the processing flow in the MEG and the processing flow in other MEGs. There are defined eight levels (0 to 7), the default level allocation is shown in FIG. 28. The respective levels shown in FIG. 28 are stored in all Ethernet-OAM frames, and checked by an apparatus that has received an OAM frame.

A MEP is positioned at the terminal point of a MEG. A MEP generates and terminates (incorporates) an OAM frame for failure management and measuring performance, and does not terminates but only monitors frames other than an OAM (for example, counts the number of frames). A MEP is assigned with an ID (a number from 1 to 8191) referred to as a MEPID, which does not have any overlaps in same MEG. A MIP is positioned at the intermediate point of a MEG. A MIP executes processing on various OAM frames. However, a MIP does not generate or terminate an OAM frame and does not have an ID.

In the above configuration, OAM frames are transmitted between MEPs. The OAM frames include test data such as connectivity, paths, defect notification, and service state transition. Then, when the MEP or the MIP receives the OAM frames, executes processing depending on the kinds of the OAM frames. Afterward, it is analyzed whether or not the MEP and the MIP are in correct operation from a result of the execution, thereby distinguishing whether or not a relay apparatus such as each MEP or MIP implements the Ethernet-OAM.

SUMMARY

According to an aspect of an embodiment, an apparatus transmits/receives an OAM frame containing kinds of tests indicating a plurality of tests for Ethernet-OAM to/from a relay apparatus; stores in a storage configuration information to generate a network configuration needed for each of the plurality of tests in a pseudo manner; if the OAM frame is received from the relay apparatus being the test object, distinguishes the kind of test contained in the relevant OAM frame and obtains network information of a network to which the relay apparatus that transmitted the OAM frame belongs; obtains configuration information corresponding to the obtained network information obtained from the stored configuration information; generates, in a pseudo manner, a network configuration to conduct a test corresponding to the kind of test distinguished using the obtained network information and the obtained configuration information and conducts the relevant test; and stores a result of the test conducted in a pre-determined test result storage.

These together with other aspects and advantages which will be subsequently apparent, reside in the details of construction and operation as more fully hereinafter described

BRIEF DESCRIPTION OF THE DRAWINGS

FIG. 3 is a diagram showing an example of information in an EO main DB;

FIG. 4 is a diagram showing an example of information in a CC other MEP monitoring DB;

FIG. 5 is a diagram showing an example of information in an LB/LT target DB;

FIG. 6 is a diagram showing an example of an EO status table;

FIG. 7 is a diagram showing an example of an EO Rx Info table;

FIG. 8 is a diagram showing an example of an EO Tx Info table;

FIG. 20 is a diagram showing an example of information in a CC/LB/LT transmission DB;

FIG. 28 is a diagram illustrating the prior art;

FIG. 31 is a diagram showing a configuration example of a CC frame;

DETAILED DESCRIPTION OF THE PREFERRED EMBODIMENTS

According to the above described conventional technique, it is necessary to arrange a plurality of relay apparatuses that implement the Ethernet-OAM, to construct a real environment such as P2P connection or multipoint connection, and to conduct a test using Ethernet-OAM functions of the relay apparatuses. Therefore, the technique has a problem of requiring many relay apparatuses and a problem of involving a large amount of labor and time to conduct the test.

Figure 29:
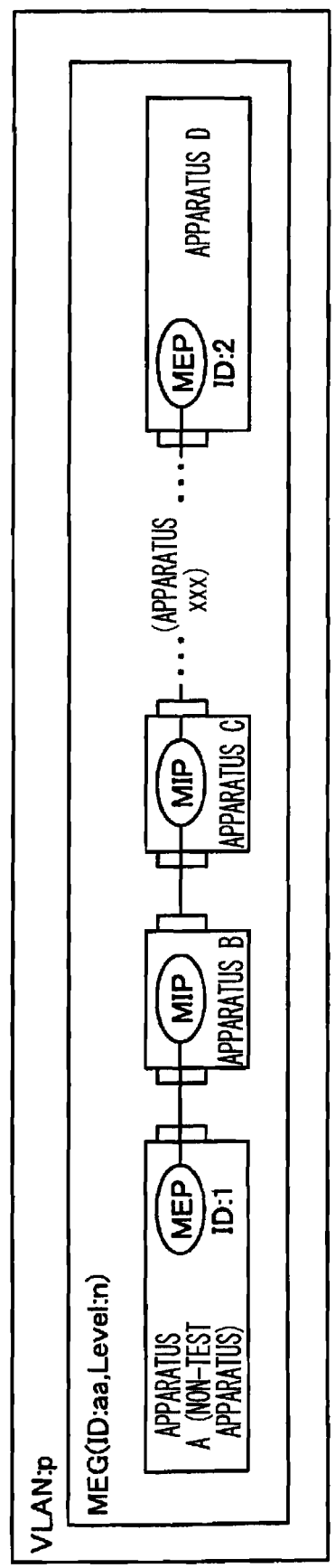
FIG. 29 is a diagram illustrating the prior art.
Figure 30:
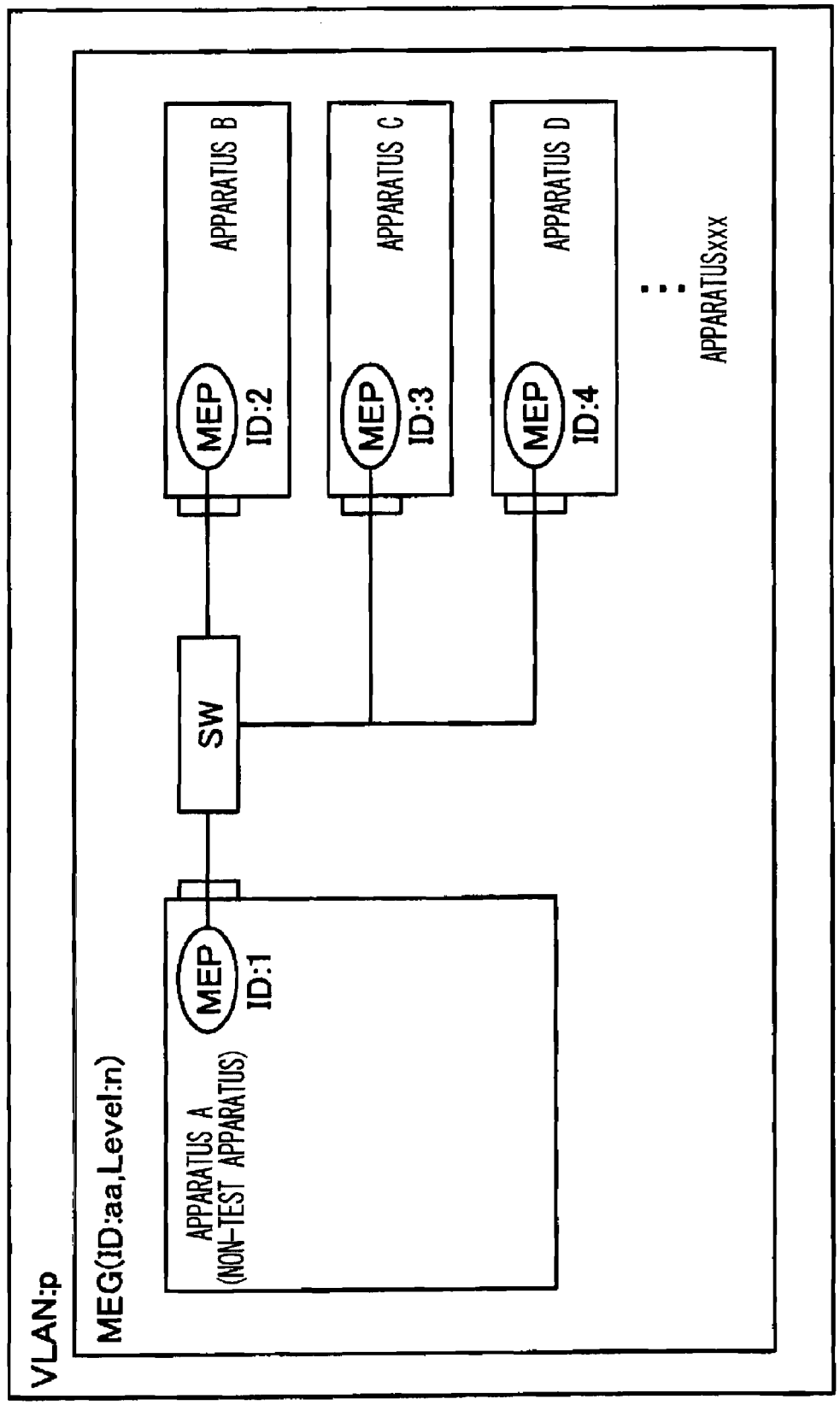
FIG. 30 is a diagram illustrating the prior art.

To test whether or not the respective relay apparatuses implement the Ethernet-OAM, or whether or not the Ethernet-OAM functions operate correctly in the P2P connection, relay apparatuses being two MEPs and relay apparatuses being a plurality of MIPs connected between the MEPs are needed, as shown in FIG. 29. When to conduct a test in the multipoint connection, a plurality of MEPs are needed to be multipoint-connected to a single MEP, as shown in FIG. 30.

Without limitation, to solve the problems of the prior art described in the above, the embodiments aim to provide a network test apparatus that can easily conduct tests to test whether or not a relay apparatus constituting the Ethernet implements the Ethernet-OAM, and that can conduct the tests using the minimum necessary relay apparatuses for various tests.

First Embodiment

First, key terms used in this embodiment will be described. An "Ethernet-OAM test apparatus" used in this embodiment is an apparatus to test whether or not a relay apparatus implements the Ethernet-OAM protocol being a standard to maintain and manage various conditions that occur in the layer 2.

The relay apparatus refers to an L2 switch used for network construction. The claimed network test apparatus means the Ethernet-OAM test apparatus.

According to the Ethernet-OAM protocol, an OAM frame being a frame for inspection is transmitted/received to/from all of relay apparatuses to be maintained and managed. The Ethernet-OAM protocol has functions to perform CC (Continuity Check), LB (Loop Back), LT (Link Trace), AIS (Alarm Indication Signal), RDI (Remote Defect Indication) or LCK (Locked Signal) by transmitting/receiving the frame.

The OAM frame contains an OPCODE representing each of kinds of tests. For example, assign 1 to a parameter OPCODE(OPCODE=1) to test the CC function; assign 2 or 3 to the parameter OPCODE (OPCODE=2 or 3) to test the LB function; assign 4 or 5 to the parameter OPCODE(OPCODE=4 or 5) to test the LT function; assign 33 to the parameter OPCODE(OPCODE=33) to test the AIS function; assign 1 to the parameter OPCODE(OPCODE=1) to test the RDI function similarly to the CC function; and assign 35 to the parameter OPCODE(OPCODE=35) to test the LCK function.

The functions will be described specifically as follows. The CC function detects disconnection, crossed lines, and the occurrence of a loop by constantly monitoring connectivity between a self-apparatus (MEP) and a plurality of other apparatuses (MEPs). More specifically, the CC function receives a multicast CCM or a unicast CCM in a frame format as shown in FIG. 31 transmitted periodically by other MEPs. The function confirms a connection to the other MEPs through the reception. The CC function also transmits a multicast CCM and a unicast CCM to the connected other MEPs from the self-apparatus. The other MEPs can confirm a connection to the self-apparatus through the transmission.

Figure 32:
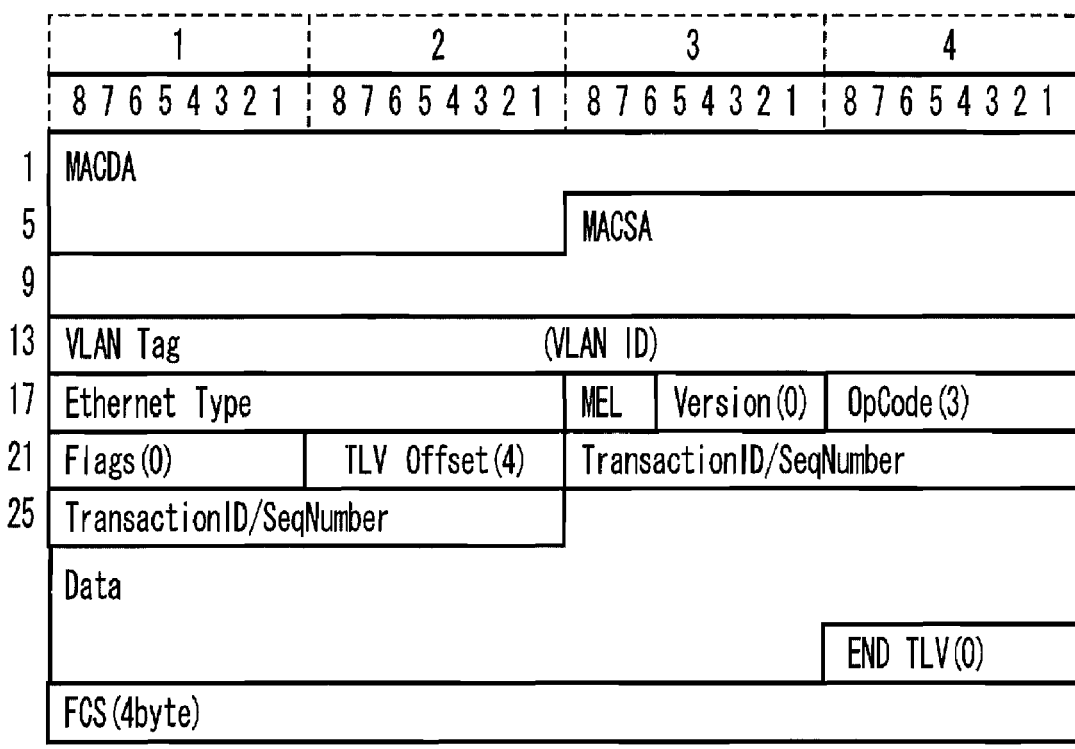
FIG. 32 is a diagram showing a configuration example of an LBM frame.
Figure 33:
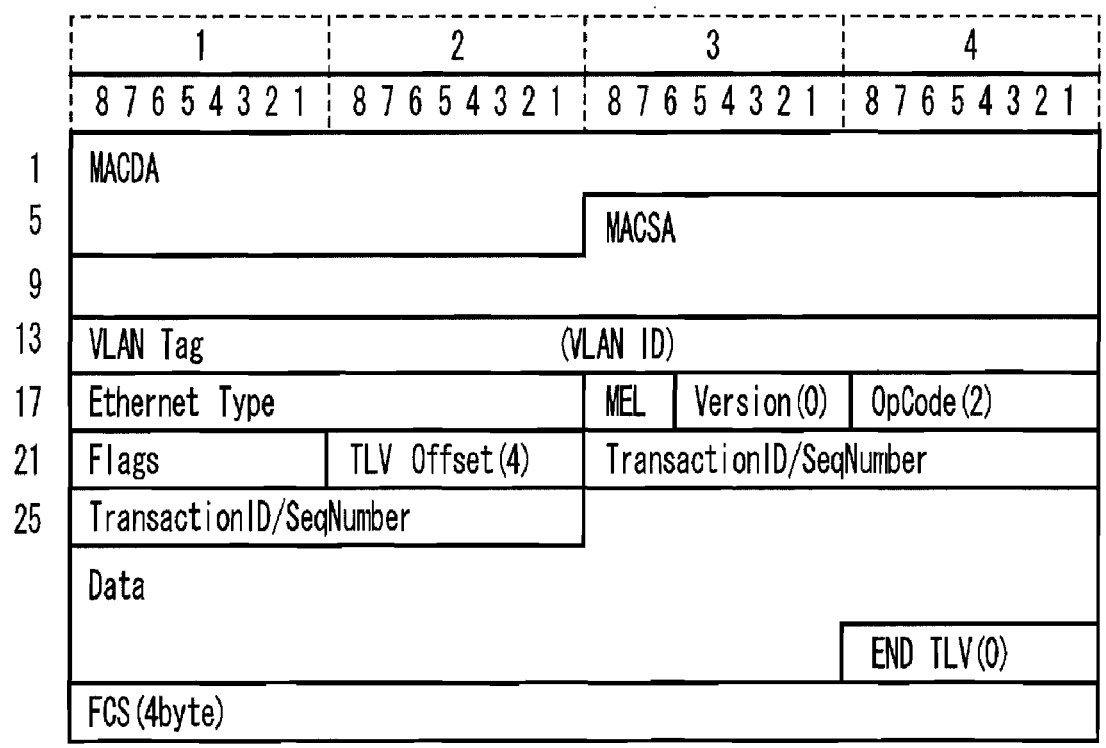
FIG. 33 is a diagram showing a configuration example of an LBR frame.

On the other hand, the LB function confirms bidirectional connectivity between the self-apparatus (MEP) and another target apparatus (MEP/MIP). Specifically, the LB function transmits an LBM in a frame format as shown in FIG. 32 to the target MEP (or MIP). The LB function also receives an LBR in a frame format as shown in FIG. 33 as a response to the LBM from the relevant target MEP (or MIP). Through the reception, the LB function confirms the bidirectional connectivity.

Figure 34:
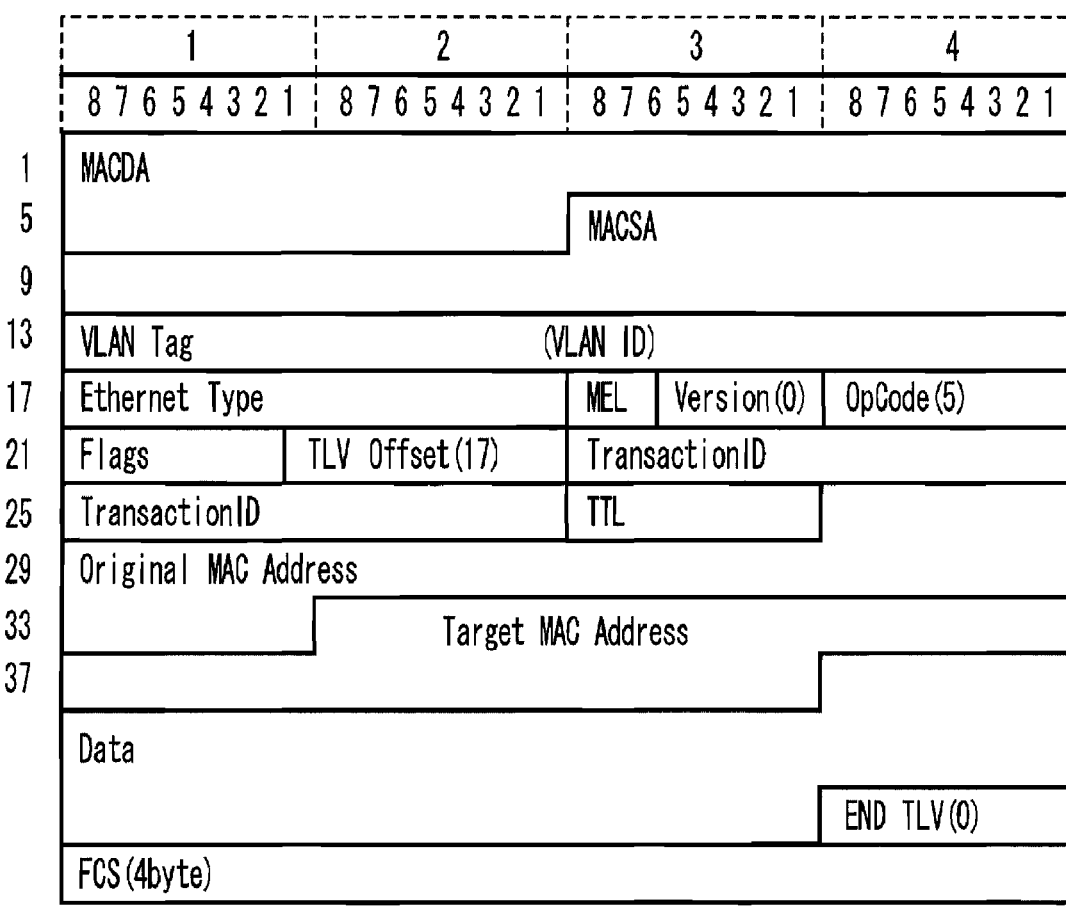
FIG. 34 is a diagram showing a configuration example of an LTM frame.
Figure 35:
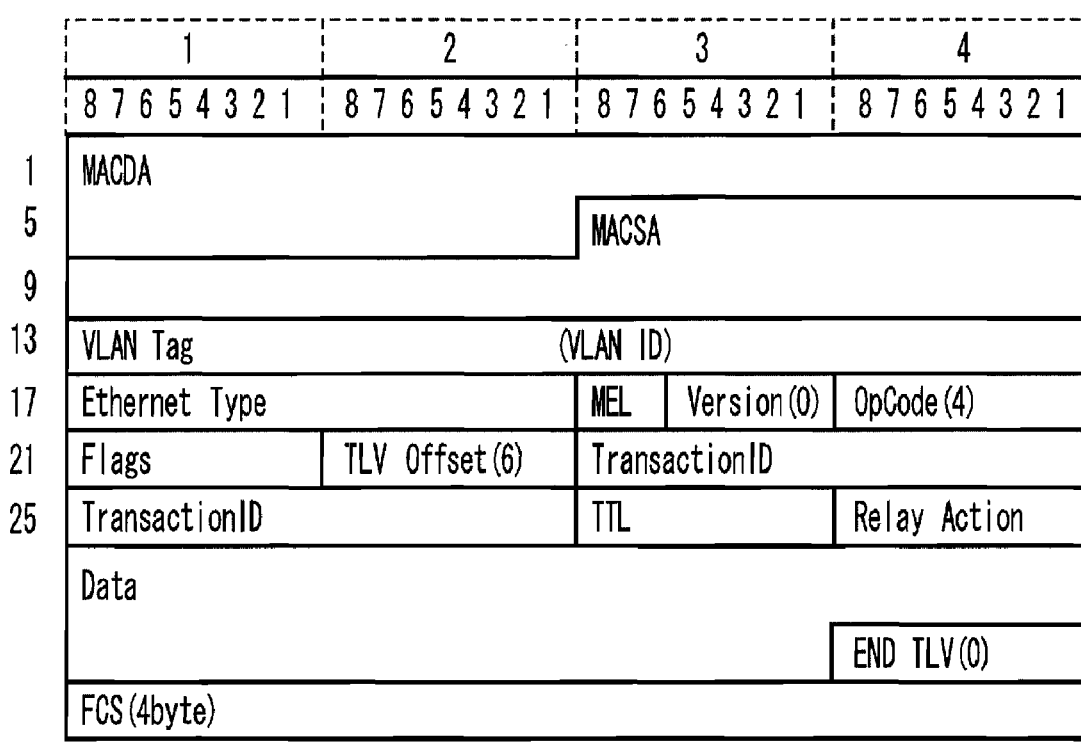
FIG. 35 is a diagram showing a configuration example of an LTR frame.

The LT function confirms a path between the self-apparatus (MEP) and the other target apparatus (MEP/MIP). Through the path confirmation by the LT function, a place where a defect occurs can be specified when disconnection occurs. Specifically, the LT function transmits an LTM in a frame format as shown in FIG. 34 to the target MEP (or MIP). A MIP on the path transmits an LTR response in a frame format as shown in FIG. 35 to the transmitting MEP, and transfers the LTM to other apparatuses. Finally in the LT function, the target MEP (or MIP) responds an LTR to the LTM transmitted from the self-apparatus. The processing allows reception of LTRs from all MEPs and MIPs on the path from the self-apparatus to the target MEP (or MIP). The processing also allows confirmation of the outward path from the self-apparatus to the target.

Figure 36:
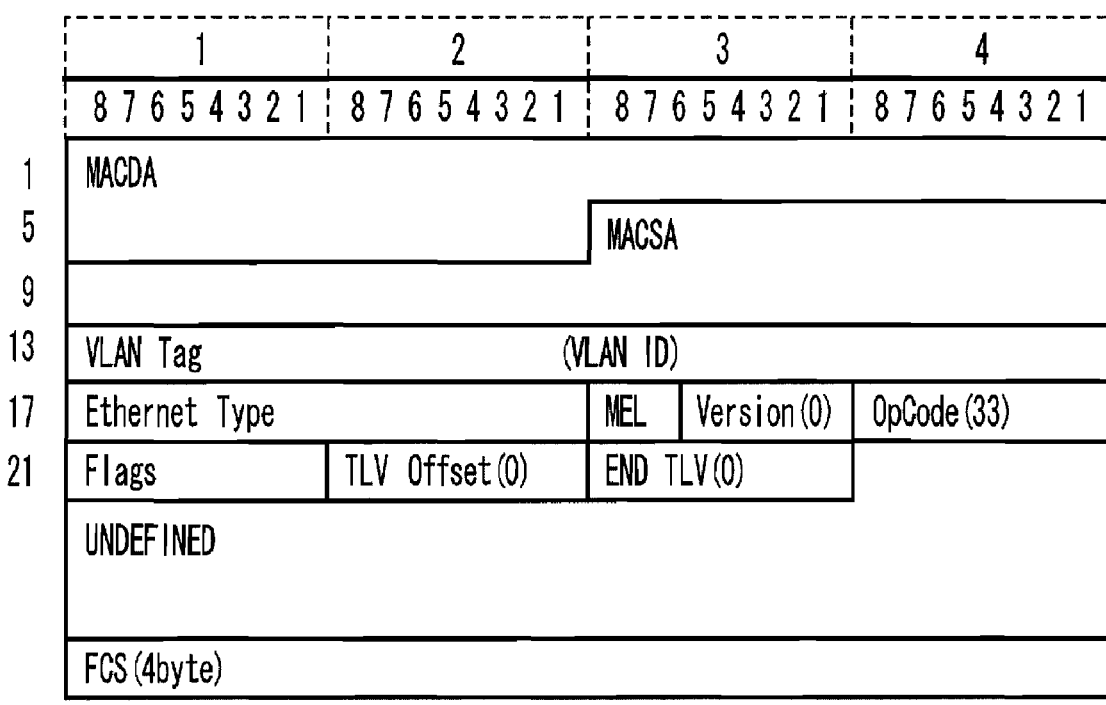
FIG. 36 is a diagram showing a configuration example of an AIS frame.

The AIS function notifies the entire network of a state such as CC alert detection or LOC (Loss Of Continuity) detection. Specifically, when the CC alert detection or the LOC detection occurs, the AIS regularly transmits an AIS frame in a frame format as shown in FIG. 36 toward a port (downward port) in the direction opposite to a port that detects the detection. For example, a transmission time interval is a second or a minute. When the AIS function of each apparatus that has received an AIS frame transmits the relevant AIS frame, it regularly transmits the highest-level signal of MEPs/MIPs in the port from the port in the direction opposite to the port that has received the AIS frame. By repeating the operation, an alert state can be notified to the entire network.

Figure 37:
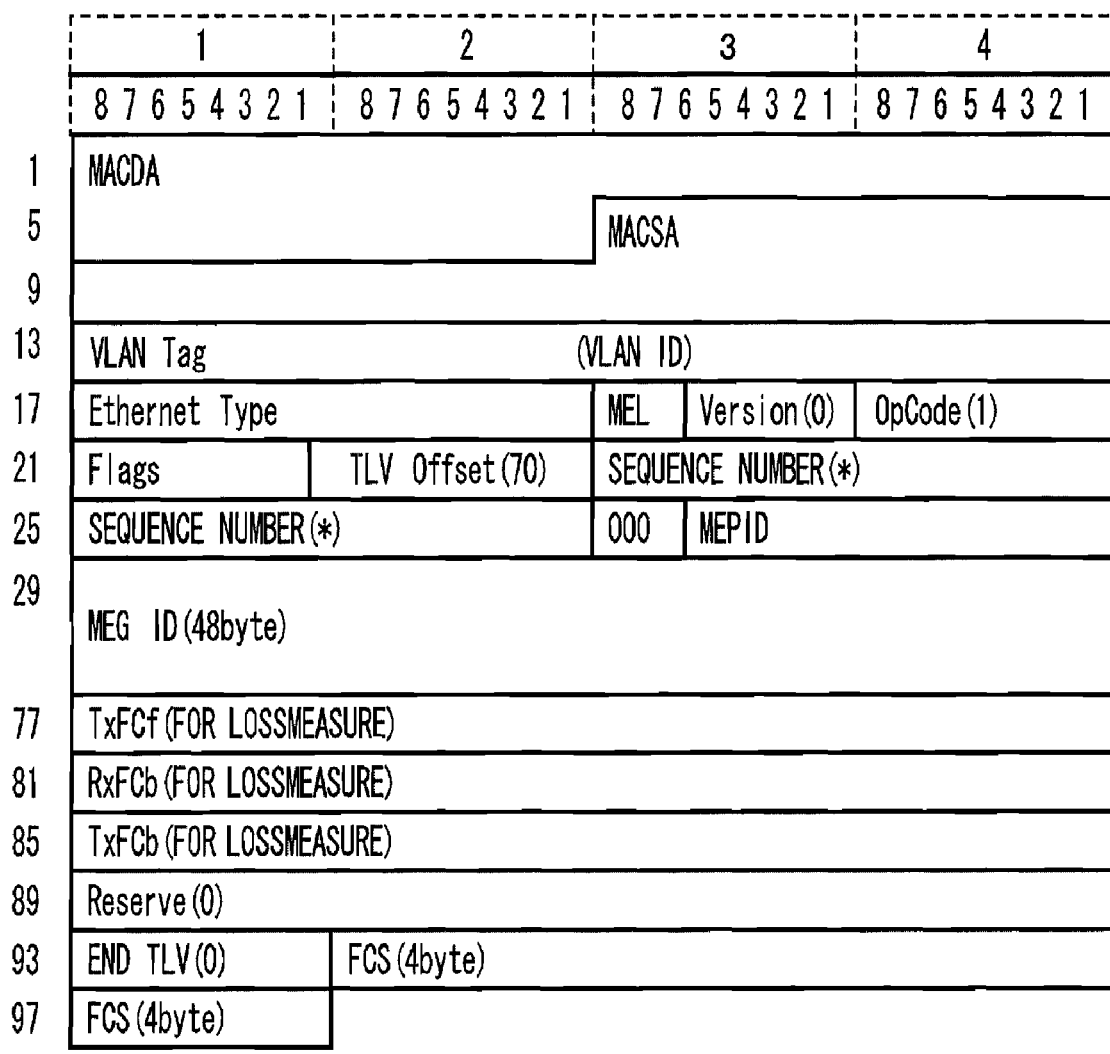
FIG. 37 is a diagram showing a configuration example of an RDI frame.

The RDI function notifies other MEPs of a state such as the CC alert detection or the LOC (Loss Of Continuity) detection. Specifically, in the alert state, the RDI function sets an RDI bit (one bit) of a CCM frame transmitted by the CC function to one (1) and notifies the other MEPs of the state, as shown in FIG. 37. Then, when the alert state terminates, the RDI function sets the RDI bit (one bit) of the CCM frame to zero (0). The RDI function operates while the CC function is in the Enable state.

Figure 38:
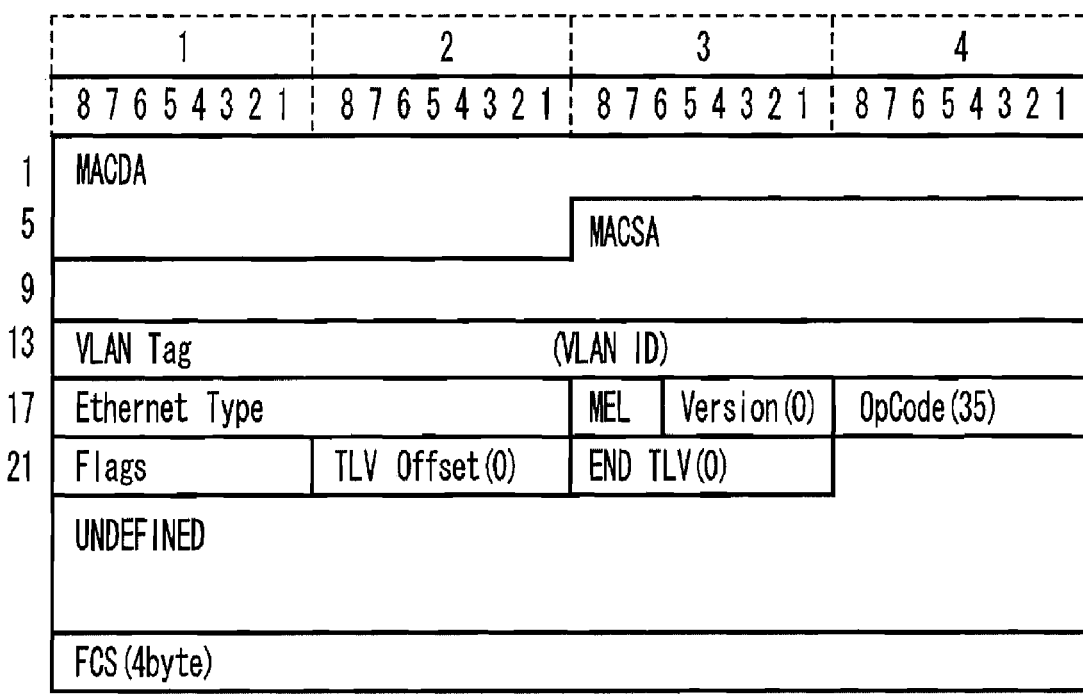
FIG. 38 is a diagram showing a configuration example of an LCK frame.

The LCK function notifies the entire network of transition from the in-service state to the out-of-service state in managing and diagnosing the network or the relay apparatuses, for example. Specifically, to notify the entire network of the out-of-service state for the management and diagnosis, the LCK function regularly transmits an LCK frame in a frame format as shown in FIG. 38 toward a port (downward port) in the direction opposite to a management and diagnosis executing port. For example, a time interval for LCK frame transmission is one second or one minute. The MEP that has received the LCK frame similarly transmits the highest-level signal of MEPs/MIPs in the port to the port in the direction opposite to the port that has received the LCK frame. By repeating the operation, the out-of-service state can be notified to the entire network.

An Ethernet-OAM test apparatus for conducting tests including the above respective functions can connect up to 32,768 (4,096 (VLAN)×8 (Level)) MEPs to one port. The apparatus can also connect up to 268,435,456 (8,192 (the maximum number of allocated MEP IDs) ×32,768 (the maximum number of MEPs per one port)) MEPs to one port and monitor the MEPs. The Ethernet-OAM test apparatus further sets the maximum number of Hops that can be tested in one MEP to 255 to conduct an LT function test, and sets the maximum number of frames (number of targets) to receive a response in one MEP to 8,191 to conduct an LB function test by multicast.

As described in the above, the Ethernet-OAM protocol including the above functions can maintain and manage various phenomena that occur in the layer 2 in a relay apparatus such as an L2 switch used for network construction. Therefore, it is important whether or not the relay apparatus used in the network implements (conforms to) the Ethernet-OAM protocol.

Overview and Characteristics of Ethernet-OAM Apparatus

Figure 1:
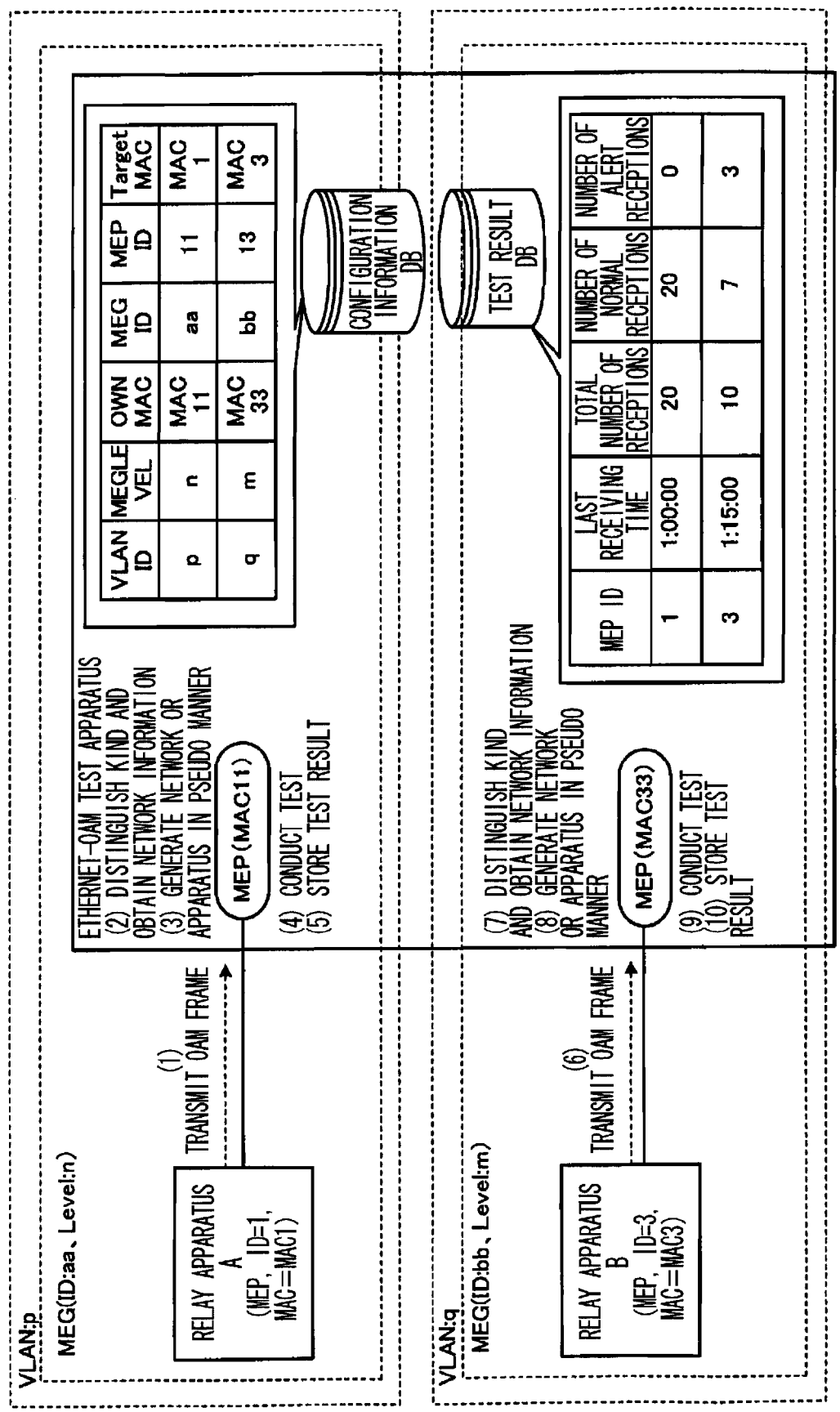
FIG. 1 is a system configuration diagram showing an overall configuration of a system including an Ethernet-OAM test apparatus according to a first embodiment.

Next, referring to FIG. 1, an overview and characteristics of the Ethernet-OAM test apparatus according to the first embodiment will be described. FIG. 1 is a system configuration diagram showing an overall configuration of a system including the Ethernet-OAM test apparatus according to the first embodiment.

As shown in FIG. 1, the Ethernet-OAM test apparatus is connected to both a relay apparatus A and a relay apparatus B being test objects via the Ethernet. The relay apparatus A is arranged in a MEG of which VLAN ID=p, ID=aa and Level=n. The relay apparatus A is allocated with ID=1 and MAC address=MAC1. Similarly, the relay apparatus B is arranged in a MEG of which VLAN ID=q, ID=bb and Level=m. The relay apparatus B is allocated with ID=3 and MAC address=MAC3.

In the above configuration, the Ethernet-OAM test apparatus according to the first embodiment is connected to relay apparatuses being the test objects, as described in the above. The Ethernet-OAM test apparatus transmits/receives OAM frames including respective kinds of tests indicating a plurality of tests for the Ethernet-OAM to/from the relay apparatuses to conduct the plurality of tests. Particularly, the apparatuses can easily conduct the tests to test whether or not relay apparatuses constituting the Ethernet implement the Ethernet-OAM. In the tests, only the minimum necessary relay apparatuses for the various tests can conduct the tests. These are main characteristics of the Ethernet-OAM test apparatus.

The main characteristics will be described specifically as follows. The Ethernet-OAM test apparatus stores configuration information to generate network configurations required for the plurality of tests in a pseudo manner (via emulation) in a configuration information DB. Giving one example, the configuration information DB stores "p, n, MAC11, aa, 11, MAC1" or "q, m, MAC33, bb, 33, MAC3", for example, as 'a "VLAN ID" uniquely allocated to constructed VLAN, a "MEG LEVEL ID" to uniquely identify a configured MEG, an "OWN MAC" indicating a MAC address of an OAM frame transmitting apparatus, a "MEG ID" uniquely allocated to a MEG to which the OAM frame transmitting apparatus belongs, a "MEP ID" uniquely allocated to a MEP being the transmitting apparatus, and "Target MAC" indicating a MAC address of an OAM frame destination apparatus'.

In the above state, the relay apparatus A transmits an OAM frame being a frame for Ethernet-OAM protocol inspection added with a kind of test 1 (OPCODE=1) to the Ethernet-OAM test apparatus (shown by (1) in FIG. 1). Describing specifically with the above example, when the CC function is tested, the relay apparatus A adds OPCODE=1 to the OAM frame and transmits the frame to the Ethernet-OAM test apparatus at time "0:40:00". Afterward, the relay apparatus A regularly transmits similar OAM frames to the Ethernet-OAM test apparatus at a minute interval for twenty times. The CC function test herein is to test whether or not destinations can receive OAM frames regularly transmitted to the designated destinations from the relay apparatus A.

When the Ethernet-OAM test apparatus receives an OAM Frame, it distinguishes a kind of test contained in the OAM frame. The Ethernet-OAM test apparatus also obtains network information about the network to which the relay apparatus that transmitted the OAM frame belongs such as the receiving time or a receiving port (see (2) in FIG. 1). Describing specifically with the above example, when the Ethernet-OAM test apparatus receives the OAM frame from the relay apparatus, it obtains "OPCODE=1". Next, the Ethernet-OAM test apparatus distinguishes the kind of test in the OAM frame to be the CC function. Then, the Ethernet-OAM test apparatus obtains the receiving time "0:40:00", the receiving port "port 1", and "VLAN ID=p", "MEG ID=aa", "Level=n", "relay apparatus A MEP ID=1" and "relay apparatus A MAC address=MAC1" as information of the network to which the relay apparatus that transmitted the OAM frame belongs, for example.

Subsequently, the Ethernet-OAM test apparatus obtains configuration information corresponding to the obtained network information from the configuration information DB. Then, the Ethernet-OAM test apparatus generates, in a pseudo manner, (emulates) a network configuration to conduct a test corresponding to the kind of test distinguished by using the obtained network information and the obtained configuration information to conduct the relevant test (shown by (3) and (4) in FIG. 1). Describing specifically with the above example, the Ethernet-OAM test apparatus obtains configuration information "TargetMAC=MAC11" corresponding to the obtained network information: "VLAN ID=p", "MEG ID=aa" and "Level=n", "relay apparatus A MEP ID=1" and "relay apparatus A MAC address=MAC1" and the reception time, for example. Next, the Ethernet-OAM test apparatus uses the obtained network information and configuration information to generate, in a pseudo manner, (emulated) a MEP having a MAC address "MAC11" being a destination of the OAM frame in the relevant Ethernet-OAM test apparatus, and conducts the CC function test.

Then, the Ethernet-OAM test apparatus stores a result of the conducted test in a test result DB (see (5) in FIG. 1). Describing specifically with the above example, the Ethernet-OAM test apparatus stores 'a "MEP ID" indicating a destination of the received OAM frame, the "last receiving time" indicating the last receiving time, the "total number of receptions" indicating receptions of OAM frames from the same destination, the "number of normal receptions" indicating the number of normal receptions among the total number of receptions, and the "number of alert receptions" indicating the number of abnormal receptions among the total number of receptions' as the result of the conducted test as in "1, 1:00:00, 20, 20, 0", for example.

Similarly, when the relay apparatus B transmits an OAM frame being an Ethernet-OAM protocol inspection frame added with a kind of test 1 (OPCODE=1) to the Ethernet-OAM test apparatus (see (6) in FIG. 1), the Ethernet-OAM test apparatus distinguishes a kind of test contained in the OAM frame at reception of the OAM frame. At the same time, the Ethernet-OAM test apparatus obtains the receiving time "1:15:00", the receiving port "port 3", network information about the network to which the relay apparatus that transmitted the OAM frame belongs: "VLAN ID=q", "MEG ID=bb", "Level=m", "relay apparatus B MEP ID=3" and "relay apparatus B MAC address=MAC3", and obtains configuration information "TargetMAC=MAC33" corresponding to the obtained network information (see (7) in FIG. 1). In the described example, the relay apparatus B regularly transmits similar OAM frames to the Ethernet-OAM test apparatus for ten times.

Then, the Ethernet-OAM test apparatus generates, in a pseudo manner, a MEP having a MAC address MAC33 being a destination of an OAM frame in the relevant Ethernet-OAM test apparatus to conduct the CC function test (see (8) and (9) in FIG. 1). Subsequently, the Ethernet-OAM test apparatus stores "3, 1:15:00, 10, 7, 3", for example, as a result of the conducted test (see (10) in FIG. 1).

As described in the above, the Ethernet-OAM test apparatus according to the first embodiment can easily conduct a test to test whether or not a relay apparatus constituting the Ethernet implements the Ethernet-OAM, as the above main characteristics. The Ethernet-OAM test apparatus can also conduct the test by only the minimum necessary relay apparatuses for various tests.

Configuration of Ethernet-OAM Test Apparatus

Figure 2:
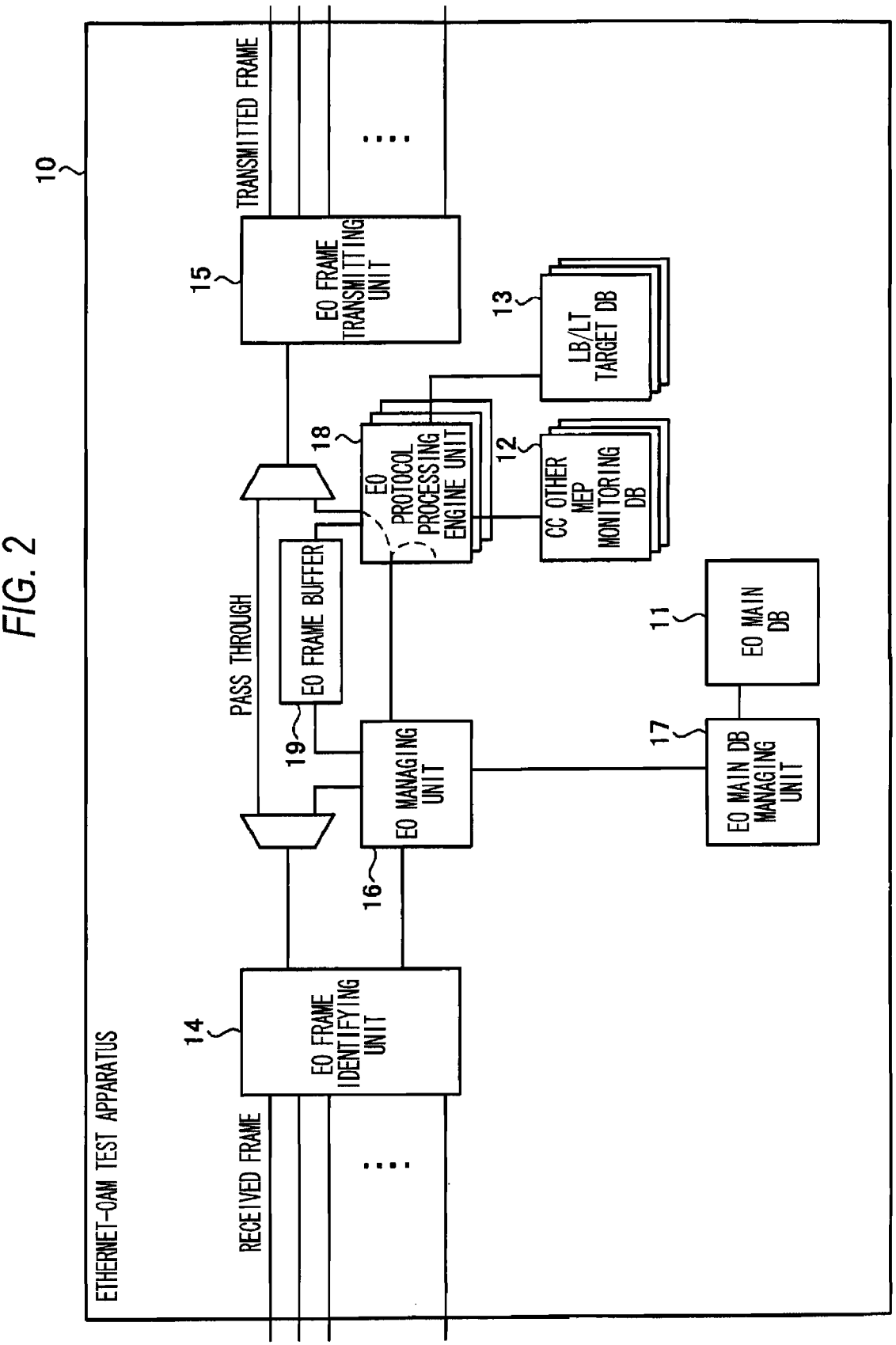
FIG. 2 is a block diagram showing a configuration of the Ethernet-OAM test apparatus according to the first embodiment.

Next, referring to FIG. 2, a configuration of the Ethernet-OAM test apparatus as shown in FIG. 1 will be described. FIG. 2 is a block diagram showing the configuration of the Ethernet-OAM test apparatus illustrated in the first embodiment. As shown in FIG. 2, an Ethernet-OAM test apparatus 10 comprises an EO main DB 11, a CC other MEP monitoring DB 12, an LB/LT target DB 13, an EO frame identifying unit 14, an EO frame transmitting unit 15, an EO managing unit 16, an EO main DB managing unit 17, an EO protocol processing engine unit 18 and an EO frame buffer 19.

The EO main DB 11 stores configuration information to generate network configurations required for a plurality of tests in a pseudo manner. Describing specifically with the above example, the EO main DB 11 stores, as shown in FIG. 3, as the configuration information to generate the network configurations required for the plurality of tests in a pseudo manner, information 'an "Index" to refer to stored information, a "Pin" indicating a receiving port, a "VLAN ID" allocated uniquely to a VLAN to which a relay apparatus for transmitting an OAM frame belongs, an "Own MEG Level" indicating a level of a MEG to which the relay apparatus for transmitting the OAM frame belongs, an "ME Type" indicating whether a test apparatus being a receiving unit is a MEP or a MIP, an "OWN MAC Addr" indicating a MAC address of a MEP or MIP of a test apparatus for receiving the OAM frame, "Pout" indicating an output port of the OAM frame, a "Target MAC Addr" indicating a MAC address to which the OAM frame is outputted, "VLAN ID out" indicating a VLAN to which the OAM frame is outputted, a "MEG ID" uniquely identifying a MEG to which the relay apparatus for transmitting the OAM frame belongs, a "MEP ID" indicating an ID of a MEP for receiving the OAM frame, "impair" indicating whether or not to delay or loss the received OAM frame, and "chain" indicating MEP and MIP connection information in the test apparatus' as in "1, 0, 1, 1, MEP, OwnMac1, 1, TarMAC1, 10, A, 1, -, -", "3, 0, 3, 5, MIP, OwnMac3, 1, TarMAC3, 30, -, -, Loss, 4", for example. The EO main DB 11 corresponds to the claimed "configuration information storage unit". FIG. 3 is a diagram showing an example of the information stored in the EO main DB.

The CC other MEP monitoring DB 12 stores the test result of the CC function test conducted by the EO protocol processing engine unit 18 that will be described later. Giving one example, the CC other MEP monitoring DB 12 stores "Defect Status (MEP detecting alert information) and other MEP information" as shown in FIG. 4 as the test result of the conducting and storage of the CC function test by the EO protocol processing engine unit 18. The stored information is stored for each MEP. FIG. 4 is a diagram showing an example of the information stored in the CC other MEP monitoring DB.

The LB/LT target DB 13 stores a test result of the LB/LT function test conducted by the EO protocol processing engine unit 18 that will be described later. Giving a specific example, the LB/LT target DB 13 stores "target information" as shown in FIG. 5 as the test result of the conducting and storage of the LB/LT function test by the EO protocol processing engine unit 18. The stored information is stored for each MEP. FIG. 5 is a diagram showing an example of the information stored in the LB/LT target DB. The CC other MEP monitoring DB 12 and the LB/LT target DB 13 correspond to the claimed "pre-determined test result storage unit".

The EO frame identifying unit 14 receives an OAM frame from a relay apparatus such as a MEP or a MIP being test objects, distinguishes a kind of test included in the OAM frame, and obtains received information such as the OAM frame receiving time and the receiving port. Describing specifically with the above example, the EO frame identifying unit 14 obtains "OPCODE=1" from the received OAM frame and distinguishes a kind of test in the OAM frame as the CC function. Then, the EO frame identifying unit 14 obtains, as the received information from the OAM frame, 'an "EO Frame type" indicating the kind of test in the received OAM frame, a "Msg type" indicating a message type of the received OAM frame, "Rx Port No" indicating the receiving port, and "Rx Time Stamp" indicating the receiving time' as in "CC=1, M, 0, 0:40:00" to generate an "EO status table" as shown in FIG. 6, and transmits the information to the EO managing unit 16 that will be described later. FIG. 6 is a diagram showing an example of the generated EO status table.

The EO frame identifying unit 14 also distinguishes "whether or not Ether Type is Ethernet-OAM" in the relevant OAM frame, "whether or not Target Mac is multicast", or "in the case of Unicast Target Mac, whether or not the Mac is stored in the EO main DB 11 described later", for example, from the received OAM frame. Afterward, the EO frame identifying unit 14 transmits a result of the distinguishing along with the obtained "EO status table" to the EO managing unit 16 that will be described later.

The EO frame transmitting unit 15 transmits an OAM frame to a relay apparatus such as a connected MEP or MIP. Describing specifically with the above example, the EO frame transmitting unit 15 transfers an OAM frame received by the IEO frame identifying unit 14 to the connected relay apparatus, or transmits a new OAM frame to the relay apparatus, according to a direction by the EO managing unit 16 or the EO protocol processing engine unit 18 that will be described later. The EO frame transmitting unit 15 comprises a plurality of ports for each connected relay apparatus, and transmits an OAM frame to a relay apparatus connected to each port.

The EO managing unit 16 obtains network information about the network to which the relay apparatus that transmitted the OAM frame belongs. Describing specifically with the above example, if the EO managing unit 16 receives the "EO status table" from the EO frame identifying unit 14, it receives the OAM frame from the EO frame identifying unit 14 and obtains the network information 'a "Rx Port No" indicating the receiving port, a "VLAN ID" indicating a VLAN to which the relay apparatus that transmitted the OAM frame belongs, a "MEG Level" indicating a level of a MEG to which the relay apparatus that transmitted the OAM frame belongs, a "Tar MAC Addr" indicating a MAC address of a MEP or MIP of the test apparatus for receiving the OAM frame', for example. Afterward, the EO managing unit 16 generates an "EO Rx Info table" as shown in FIG. 7, and transmits the table to the EO main DB managing unit 17 that will be described later. The EO managing unit 16 herein transmits the received OAM frame to the EO frame buffer 19 that will be described later. FIG. 7 is a diagram showing an example of the generated EO Rx Info table.

When the EO managing unit 16 receives configuration information "EO Tx Info table" to generate, in a pseudo manner, the network configuration generated and transmitted by the EO main DB managing unit 17 that will be described later, the EO managing unit 16 transmits the received "EO Tx Info table" to the EO protocol processing engine unit 18 that will be described later. The EO frame identifying unit 14 and the EO managing unit 16 described in the above correspond to the claimed "kind distinguishing unit".

The EO main DB managing unit 17 obtains configuration information corresponding to the network information obtained by the EO managing unit 16 from the EO main DB 11 and transmits the information to the EO protocol processing engine unit 18 that will be described later. Describing specifically with the above example, the EO main DB managing unit 17 obtains, as the configuration information corresponding to the network information "EO Rx Info table" obtained by the EO managing unit 16, 'a "ME Type" indicating whether a test apparatus being a destination of the OAM frame is a MEP or MIP, "Tx Port No" indicating an output port of the OAM frame, a "Target MAC Addr" indicating a MAC address of the destination relay apparatus, a "VLAN ID" indicating a VLAN of the network generated in a pseudo manner, a "MEG Level" indicating a level of a MEG generated in a pseudo manner, a "MEG ID" indicating the MEG generated in a pseudo manner, a "MEP ID" indicating a MEP generated in a pseudo manner, "impair" indicating whether or not delay or lose the received OAM frame, and "chain" indicating MEP and MIP connection information in the test apparatus' from the EO main DB 11. Furthermore, the EO main DB managing unit 17 generates an "EO Tx Info table" as shown in FIG. 8. Then, the EO main DB managing unit 17 transmits the generated "EO Tx Info table" to the EO protocol processing engine unit 18. FIG. 8 is a diagram showing an example of the generated EO Tx Info table.

The EO protocol processing engine unit 18 generates, in a pseudo manner, a network configuration to conduct a test corresponding to the kind of test distinguished using the network information obtained by the EO main DB managing unit 17 and the obtained configuration information. Afterward, the EO protocol processing engine unit 18 conducts the test, and stores a result of the test in the CC other MEP monitoring DB 12 or the LB/LT target DB 13. Specifically, the EO protocol processing engine unit 18 generates, in a pseudo manner, the network configuration to conduct the test corresponding to the kind of test identified by the EO frame identifying unit 14 from the network information "EO Rx Info table" obtained by the EO main DB managing unit 17, and the configuration information "EO Tx Info table" obtained by the EO main DB managing unit 17 and received via the EO managing unit 16 and conducts the relevant test. Then, the EO protocol processing engine unit 18 stores the received information "EO status table" generated by the EO frame identifying unit 14 and the result of the conducted test in the CC other MEP monitoring DB 12 or the LB/LT target DB 13.

Giving an example, the EO protocol processing engine unit 18 receives "Rx Port No=0, VLAN ID=1, MEG ID=A, Tar MAC Addr=TarMAC1" as the network information "EO Rx Info table", and receives the configuration information "ME Type=MEP, Tx Port No=1, Target MAC Addr=TarMAC1, VLAN ID=10, MEG Level=1, MEG ID=A, MEG ID=1, impair=Delay, chain=10".

Then, the EO protocol processing engine unit 18 specifies "transmitter VLAN=1, transmitter MEG Level=1, destination MAC address=TarMAC1", for example, from the above information. By this specification, the EO protocol processing engine unit 18 generates, in a pseudo manner, a destination MEP of the OAM frame transmitted from the relay apparatus and conducts the test. In this case, the EO protocol processing engine unit 18 generates, in a pseudo manner, a MEP corresponding to "VLAN ID=1, MEG Level=1, MAC address=TarMAC1" as a relay apparatus that receives the OAM frame.

During the test conduction, the EO protocol processing engine unit 18 delays the relevant OAM frame since the received configuration information includes "impair=Delay" and gets an OAM frame from the EO frame buffer 19 described later. Then, the EO protocol processing engine unit 18 stores the received information "EO status table" and the test result in the CC other MEP monitoring DB 12 or the LB/LT target DB 13. If the received configuration information includes "impair=Loss", the EO protocol processing engine unit 18 does not get the OAM frame from the EO frame buffer 19, but discards it. The EO main DB managing unit 17 and the EO protocol processing engine unit 18 correspond to the claimed "test conducting unit" and "test result storing unit".

The EO frame buffer 19 temporally stores the OAM frame transmitted from the relay apparatus. Giving a specific example, the EO frame buffer 19 temporally stores the OAM frame transmitted from the EO managing unit 16 until it will be got by the EO protocol processing engine unit 18.

Processing by Ethernet-OAM Test Apparatus

Next, referring to FIGS. 9 to 12, processing by the Ethernet-OAM test apparatus will be described. Herein, processing to generate the received information "EO status table" will be described: processing to generate network information "EO Rx Info table", processing to generate configuration information "EO Tx Info table", and test performing processing will be described in that order.

(Received Information "EO status table" Generating Processing)

Figure 9:
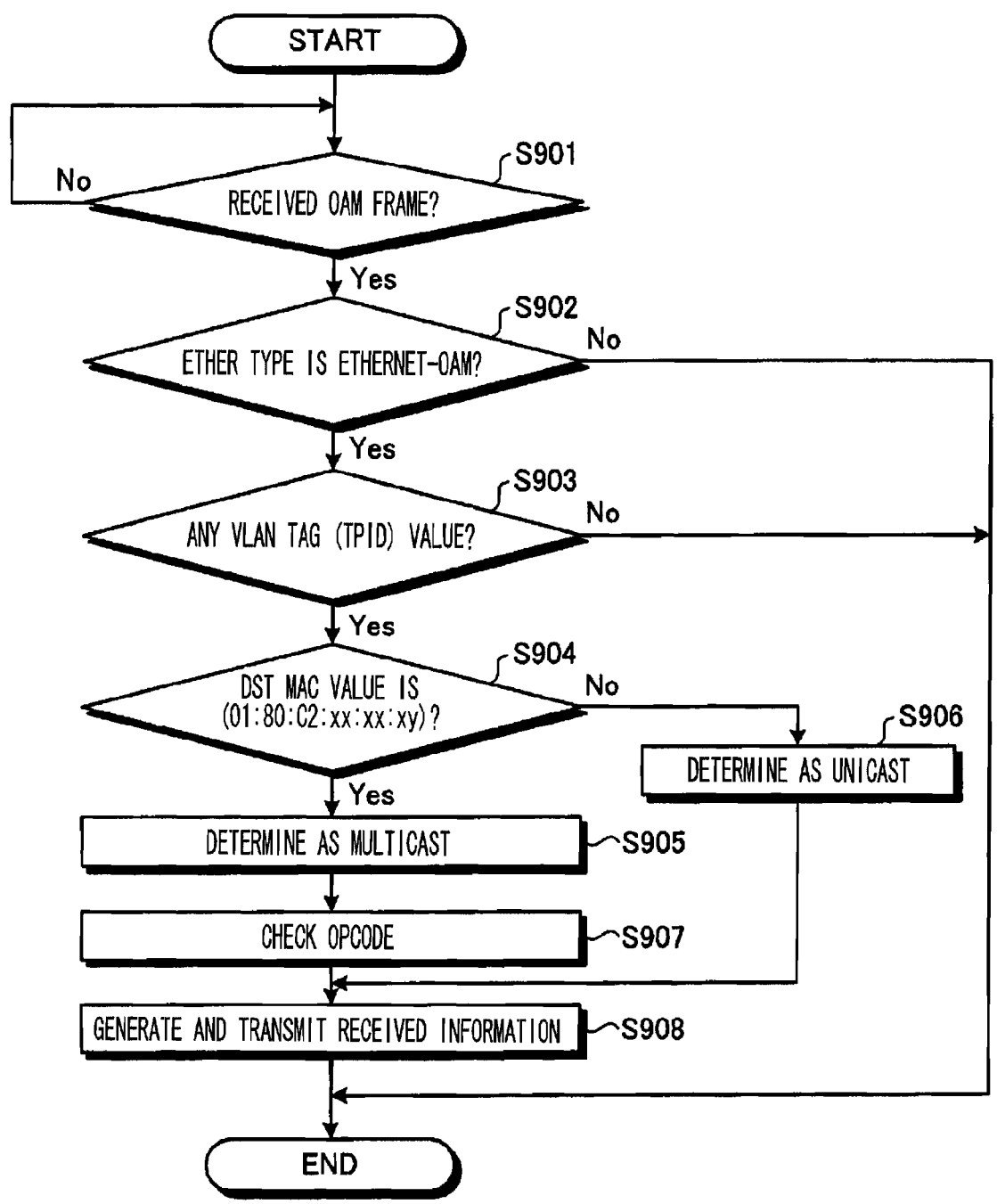
FIG. 9 is a flowchart showing the Flow of received information generating processing in the Ethernet-OAM test apparatus according to the first embodiment.

Referring to FIG. 9, the received information "EO status table" generating processing will be described. FIG. 9 is a flowchart showing the flow of the received information generating processing in the Ethernet-OAM test apparatus according to the first embodiment.

As shown in FIG. 9, when an OAM frame is received from the relay apparatus (S901: Yes), if an "Ether Type" of the relevant OAM frame is "Ethernet-OAM" (S902: Yes), and a "VLAN ID" of the relevant OAM frame is contained in the EO main DB 11 (S903: Yes), then the EO frame identifying unit 14 of the Ethernet-OAM test apparatus determines whether or not a "Dst MAC value (Tar MAC Addr)" of the relevant OAM frame is "01:80:c2:xx:xx:xy" (S904).

Then, if the "Dst MAC value (Tar MAC Addr)" of the relevant OAM frame is "01:80:c2:xx:xx:xy" (S904:Yes), the EO frame identifying unit 14 determines the relevant OAM frame as Multicast (S905).

Otherwise, if the "Dst MAC value (Tar MAC Addr)" of the relevant OAM frame is not "01:80:c2:xx:xx:xy" (S904:No), the EO frame identifying unit 14 determines the relevant OAM frame as Unicast (S906).

Returning to S902, if the "Ether Type" of the relevant OAM frame is not "Ethernet-OAM" (S902:No) or the "VLAN ID" of the relevant OAM frame is not contained in the EO main DB 11 (S903:No), the EO frame identifying unit 14 terminates the relevant processing.

After it is determined whether the relevant OAM frame is Multicast or Unicast, the EO frame identifying unit 14 checks an Opcode of the relevant OAM frame to distinguish the kind of test (S907).

Then, the EO frame identifying unit 14 generates received information "EO status table" from a result of the determination whether to be Multicast or Unicast, and the kind of test by checking the Opcode, as a result of the above determination. Then, the EO frame identifying unit 14 transmits the generated result to the EO managing unit 16 (S908).

(Network Information "EO Rx Info table" Generating Processing)

Figure 10:
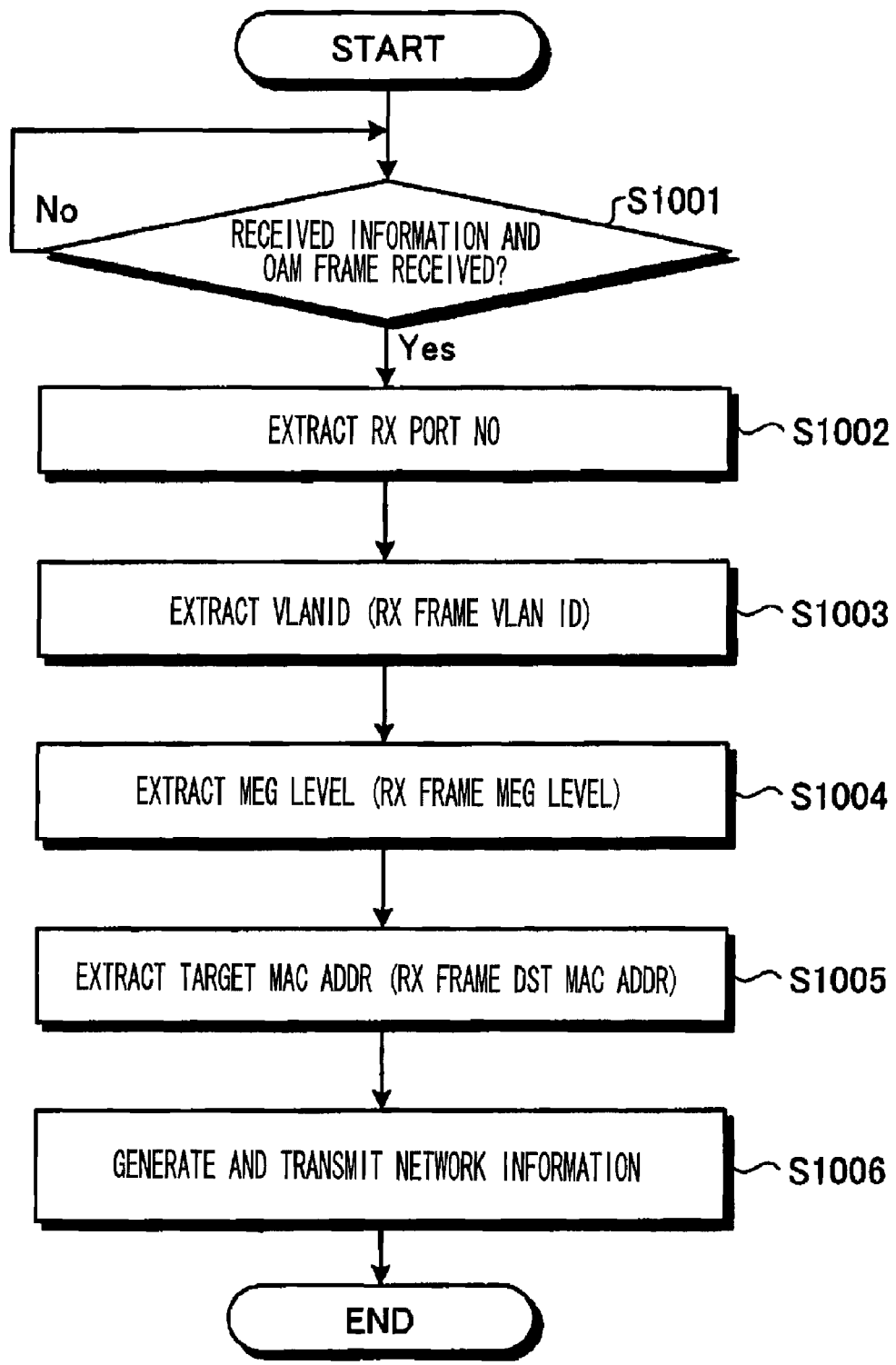
FIG. 10 is a flowchart showing the flow of network information generating processing in the Ethernet-OAM test apparatus according to the first embodiment.

Referring to FIG. 10, the network information "EO Rx Info table" generating processing will be described. FIG. 10 is a flowchart showing the flow of the network information generating processing in the Ethernet-OAM test apparatus according to the first embodiment.

As shown in FIG. 10, when the OAM frame and the received information received from the EO frame identifying unit 14 are received (S1001:Yes), the EO managing unit 16 of the Ethernet-OAM test apparatus extracts "Rx Port NO" from the OAM frame received by the EO frame identifying unit 14 (S1002).

Subsequently, the EO managing unit 16 extracts a "VLAN ID (RxFrame VLAN ID)", a "MEG Level (RxFrame MEG Level)" and a "Target MAC Addr (RxFrame Dst MAC Addr)" from the OAM frame received by the EO frame identifying unit 14 (S1003 to S1005).

Then, the EO managing unit 16 generates "EO Rx Info table" as network information from the extracted various information, and transmits the information to the EO main DB managing unit 17 (S1006).

(Configuration Information "EO Tx Info Table" Generating Processing)

Figure 11:
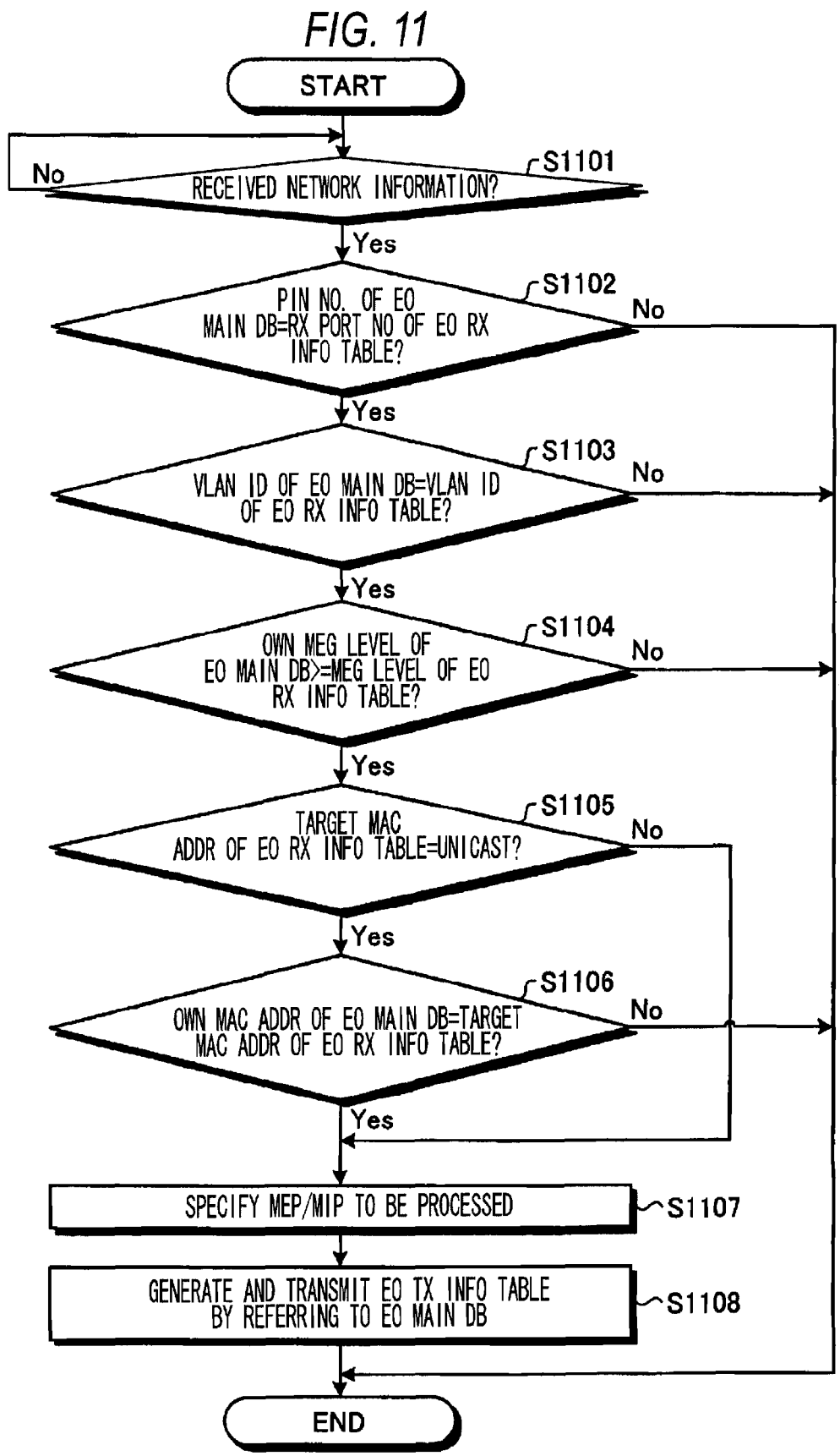
FIG. 11 is a flowchart showing the flow of configuration information generating processing in the Ethernet-OAM test apparatus according to the first embodiment.

Referring to FIG. 11, the configuration information "EO Tx Info table" generating processing will be described. FIG. 11 is a flowchart showing the flow of the configuration information generating processing in the Ethernet-OAM test apparatus according to the first embodiment.

As shown in FIG. 11, when the EO main DB managing unit 17 of the Ethernet-OAM test apparatus receives the network information (S1101:Yes), it determines whether or not "Pin No. of EO main DB 11" equals to "Rx Port No of EO Rx Info table" (S1102).

Subsequently, if "Pin No. of EO main DB 11" equals to "Rx Port No of EO Rx Info table" (S1102:Yes), the EO main DB managing unit 17 of the Ethernet-OAM test apparatus determines whether or not "VLAN ID of EO main DB 11" equals to "VLAN ID of EO Rx Info table" (S1103).

Then, if "VLAN ID of EO main DB 11" equals to "VLAN ID of EO Rx Info table" (S1103:Yes), the EO main DB managing unit 17 determines whether or not "Own MEG Level of EO main DB 11" is "MEG Level of EO Rx Info table" or higher (S1104).

Subsequently, if "MEG Level of EO main DB 11" is "Own MEG Level of EO Rx Info table" or higher (S1104:Yes), the EO main DB managing unit 17 determines whether or not "Target MAC Addr of EO Rx Info table" is unicast (S105).

Then, if "Target MAC Addr of EO Rx Info table" is unicast (S1105:Yes), the EO main DB managing unit 17 determines whether or not "Own MAC Addr of EO main DB 11" equals to "Target MAC Addr of EO Rx Info table" (S1106).

Then, if "Own MAC Addr of EO main DB 11" equals to "Target MAC Addr of EO Rx Info table" (S1106:Yes), the EO main DB managing unit 17 specifies MEP/MIP that are destinations of the OAM frame and are to be processed (S1107).

Otherwise, if "Target MAC Addr of EO Rx Info table" is not unicast (S1105:No), the EO main DB managing unit 17 does not perform the processing at S1106 but performs the processing at S1107.

Then, the EO main DB managing unit 17 specifies the MEP/MIP that are destinations of the OAM frame and are to be processed, it generates configuration information "EO Tx Info table" from the EO main DB 11, and transmits the information to the EO protocol processing engine unit 18 via the EO managing unit 16 (S1108). Afterward, the EO protocol processing engine unit 18 uses the received configuration information "EO Tx Info table" to generate a pseudo-network or relay apparatus.

Returning to S1102, if "Pin No. of EO main DB 11" does not equal to "Rx Port No of EO Rx Info table" (S1102:No), if "VLAN ID of EO main DB 11" does not equal to "VLAN ID of EO Rx Info table" (S1103:No), if "Own MEG Level of EO main DB 11" is lower than "Own MEG Level of EO Rx Info table" (S1104:No), and if "Own MAC Addr of EO main DB 11" does not equal to "Target MAC Addr of EO Rx Info table" (S1106:No), then the EO main DB managing unit 17 terminates the processing.

(Test Performing Processing)

Figure 12:
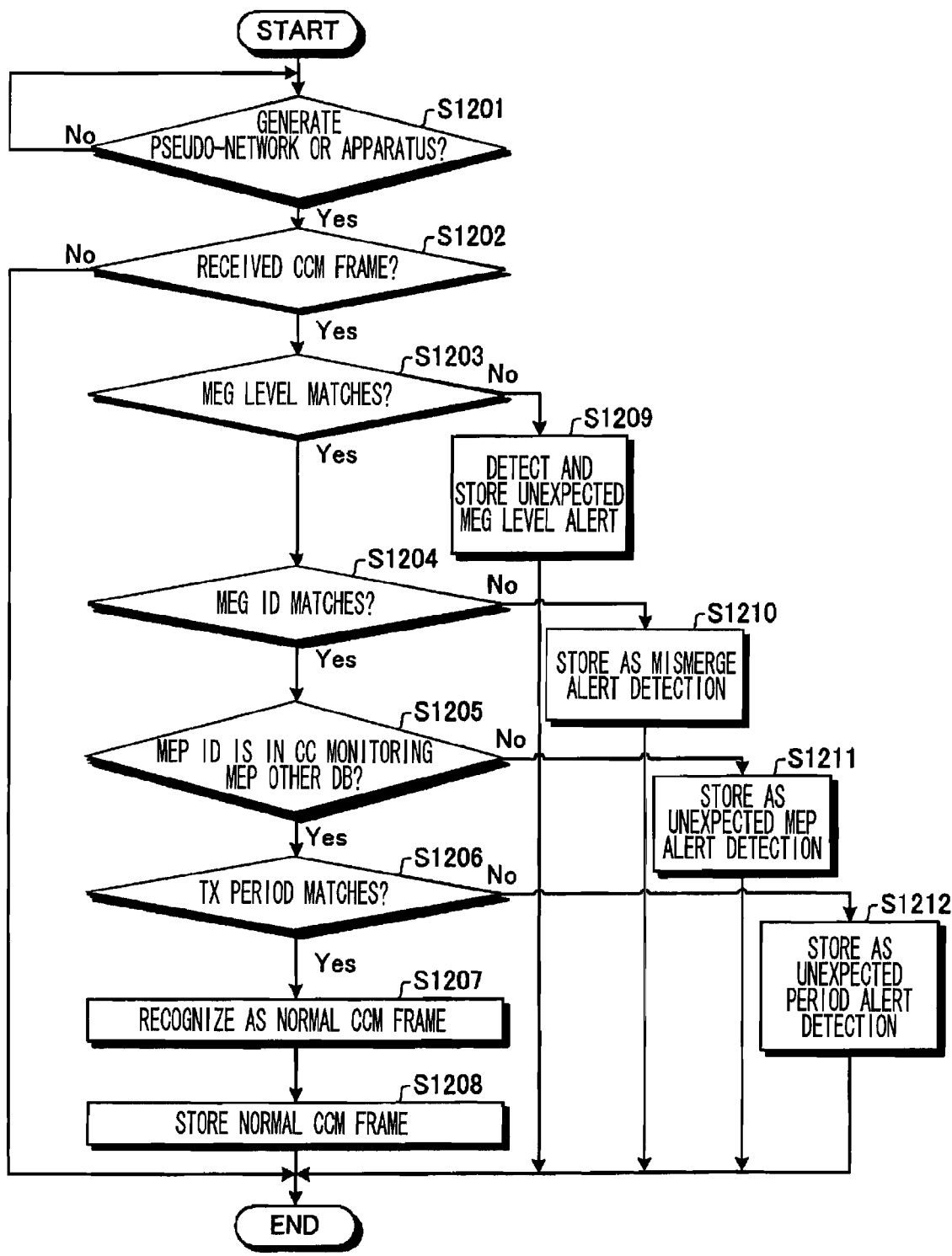
FIG. 12 is a flowchart showing the flow of test performing processing in the Ethernet-OAM test apparatus according to the first embodiment.

Referring to FIG. 12, test performing processing will be described. FIG. 12 is a flowchart showing the flow of the test performing processing in the Ethernet-OAM test apparatus according to the first embodiment. Herein, the test conduction for the CC function as one of the Ethernet-OAM protocol functions will be described.

As shown in FIG. 12, when the EO protocol processing engine unit 18 uses the received configuration information to generate a pseudo (emulated)-network or a pseudo (emulated)-apparatus (S1201:Yes), it determines whether or not a kind of test of the relevant OAM frame is in the CCM frame (S1202).

Then, if the kind of test of the relevant OAM frame is CCM (S1202:Yes), the EO protocol processing engine unit 18 determines whether or not "MEG Level" of the received OAM frame matches "MEG Level" of the network (or apparatus) generated in a pseudo manner (S1203).

In the case of matching the both "MEG Level" (S1203:Yes), the EO protocol processing engine unit 18 determines whether or not "MEG ID" of the received OAM frame matches "MEG ID" of the network generated in a pseudo manner (S204).

In the case of matching the both "MEG ID" (S1204:Yes), the EO protocol processing engine unit 18 determines whether or not the CC other MEP monitoring DB 12 contains "MEP ID" matching "MEP ID" of the received OAM frame (S1205).

If the DB 12 contains a matching "MEP ID" (S1205:Yes), the EO protocol processing engine unit 18 determines whether or not "TxPeriod" in the received OAM frame matches "TxPeriod" of the network generated in a pseudo manner (S1206).

In the case of matching the both "TxPriod" (S1206:Yes), the EO protocol processing engine unit 18 recognizes the received OAM frame as a normal CCM frame (S1207), and stores information about the normal CCM frame as the test result in the CC other MEP monitoring DB 12 (S1208).

Returning to S1203, if "MEG Level" in the received OAM frame does not match "MEG Level" of the network (or apparatus) generated in a pseudo manner (S1203:No), the EO protocol processing engine unit 18 stores the result as "Unexpected MEG Level alert detection" in the CC other MEP monitoring DB 12 (S1209).

Returning to S1204, if "MEG ID" in the received OAM frame does not match "MEG ID" of the network generated in a pseudo manner (S1204:No), the EO protocol processing engine unit 18 stores the result as "Mismerge alert detection" in the CC other MEP monitoring DB 12 (S1210).

Similarly, returning to S1205, if the CC other MEP monitoring DB 12 does not contain "MEP ID" matching "MEP ID" in the received OAM frame (S1205:No), the EO protocol processing engine unit 18 stores the result as "Unexpected MEP alert detection" in the CC other MEP monitoring DB 12 (S1211).

Similarly, returning to S1206, if "TxPeriod" in the received OAM frame does not match "TxPeriod" of the network generated in a pseudo manner (S1206:No), the EO protocol processing engine unit 18 stores the result as "Unexpected Period alert detection" in the CC other MEP monitoring DB 12 (S1212).

Effects of First Embodiment

As described in the above, according to the first embodiment, in the case of storing configuration information to generate network configurations required for a plurality of tests in a pseudo manner and receiving an OAM frame from a relay apparatus being a test object, a kind of test contained in the relevant OAM frame is distinguished. Along with that, network information about a network to which the relay apparatus that transmitted the OAM frame belongs is obtained, configuration information corresponding to the obtained network information is obtained, and a network configuration to conduct a test corresponding to the kind of test distinguished using the obtained network information and the obtained configuration information is generated in a pseudo manner to conduct the relevant test. Then, a result of the conducted test is stored, so that the test can be conducted easily to test whether or not a relay apparatus constituting the Ethernet implements the Ethernet-OAM, and the test can be conducted using only the minimum necessary relay apparatuses for various tests.

For example, before the Ethernet network is constructed, it can be tested whether or not the relay apparatuses used for the construction implement the Ethernet-OAM protocol, and the CC function or other functions can be tested by generating the minimum necessary apparatuses or networks in a pseudo manner. As a result, the tests can be conducted easily, and the tests can be conducted using only the minimum necessary relay apparatuses for various tests. Further, if the Ethernet network has already been constructed, typically it is necessary to use all networks to conduct the tests. However, with the embodiments, the tests can be conducted by generating the minimum necessary relay apparatuses or networks for the various tests in a pseudo manner. As a result, the tests can be conducted easily.

Moreover, according to the first embodiment, if an OAM frame transmitted to a certain party is received, then a kind of test contained in the relevant OAM frame is distinguished, and network information about a network to which the relay apparatus that transmitted the OAM frame belongs is obtained. Then, configuration information corresponding to the obtained network information is obtained, a test corresponding to a kind of test distinguished using the obtained configuration information is conducted, and a result of the conducted test is stored, so that even a test limited to P2P connection can be conducted easily.

For example, assume that a certain party is a remote party that requires a large number of Hops if a test is conducted in a network that has been already constructed. Then, the entire network needs to be used for the test, incurring very high risk in the test. With the embodiments, the test can be conducted by generating a remote party requiring a large number of Hops in a pseudo manner, hence the test can be conducted with low risk and easily.

Furthermore, according to the first embodiment, a delay time indicating a delay in OAM frame transmission time, and loss information of losing an OAM frame are further stored. When an OAM frame is received, time to receive the OAM frame is delayed by the delay time if the delay time is stored. An OAM frame is not received but lost if loss information is stored, so that defects other than the Ethernet-OAM protocol can be assumed for a test. As a result, a more precise test can be conducted.

Second Embodiment

The CC function test has been described in relation to the first embodiment, but the embodiments are not limited to it. Some functions other than the CC function can also be similarly tested.

In relation to a second embodiment, conducting tests of the functions other than the CC function will be described referring to FIGS. 13 to 16. In relation to the second embodiment, processing by the Ethernet-OAM test apparatus according to the second embodiment will be described. Processing until a pseudo (emulated)-network or pseudo (emulated) apparatus is generated, which is similar to that in the first embodiment, will not be described herein in detail.

Processing by Ethernet-OAM Test Apparatus
(Processing Flow to Test LB Function)

Figure 13:
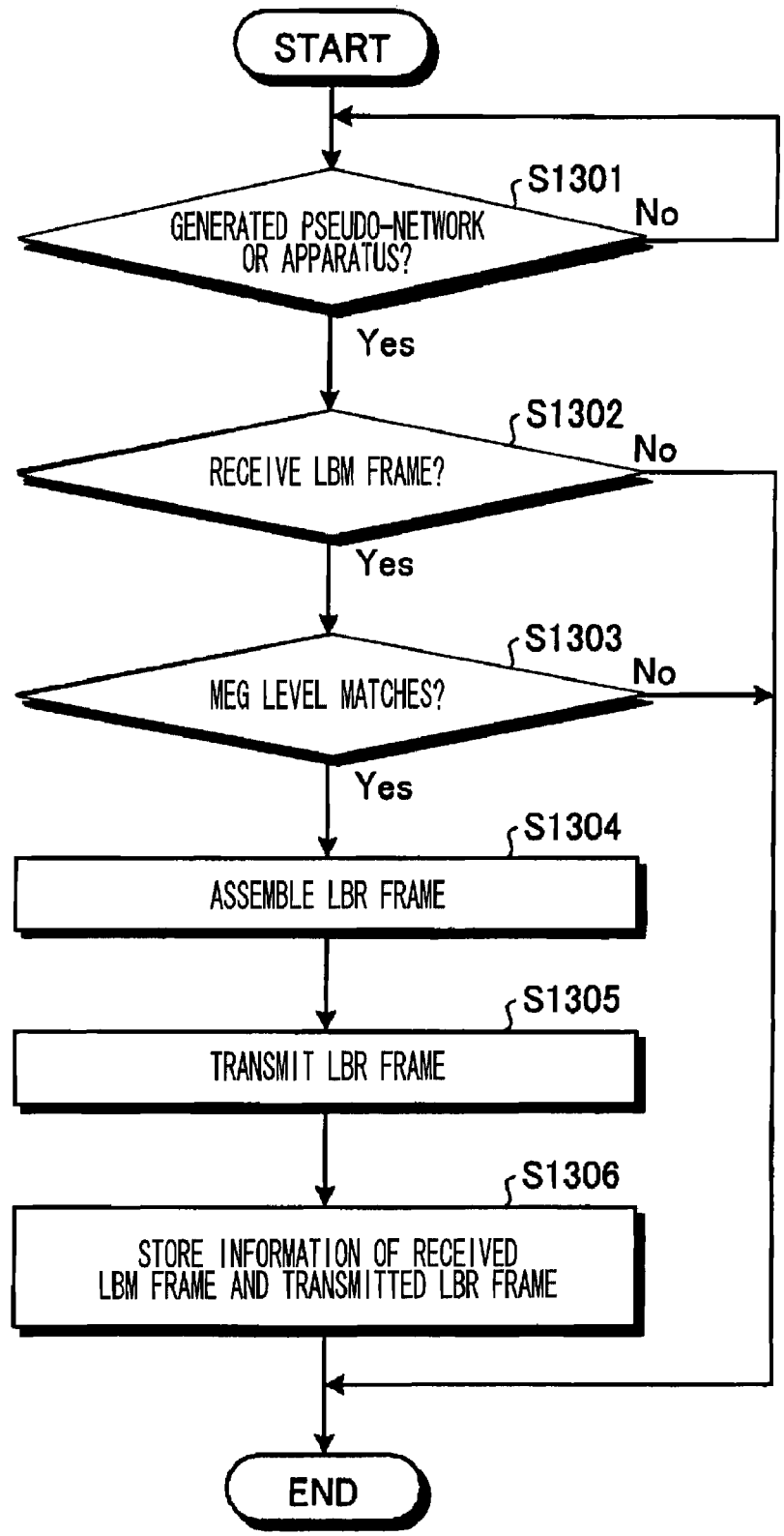
FIG. 13 is a flowchart showing the flow of processing to test the LB function in an Ethernet-OAM test apparatus according to a second embodiment.

First, a processing flow to test the LB function will be described referring to FIG. 13. FIG. 13 is a flowchart showing the flow of processing to test the LB function by the Ethernet-OAM test apparatus according to the second embodiment.

As shown in FIG. 13, when a pseudo-network or apparatus is generated using received configuration information (S301: Yes), the EO protocol processing engine unit 18 determines whether or not a kind of test in the relevant OAM frame indicates an LBM frame (S1302).

If the kind of test in the relevant OAM frame is LBM (S1302:Yes), the EO protocol processing engine unit 18 determines whether or not "MEG Level" in the received OAM frame matches "MEG Level" of the network (or apparatus) generated in a pseudo manner (S1303).

In the case of matching the both "MEG Level" (S1303: Yes), the EO protocol processing engine unit 18 assembles an LBR frame to transmit a response of the received OAM frame (LBM frame) (S1304), and transmits the assembled LBR frame to an OAM frame transmitting relay apparatus (S1305).

Afterward, the EO protocol processing engine unit 18 stores the received OAM frame (LBM frame) and various information contained in the transmitted LBR frame in the LB/LT target DB 13 (S1306).

Returning to S1302, if the kind of test in the relevant OAM frame is not LBM (S1302:No), or "MEG Level" in the received OAM frame does not match "MEG Level" of the network (or apparatus) generated in a pseudo manner (S1303: No), then the EO protocol processing engine unit 18 terminates the processing.

(Processing Flow to Test LT Function)

Figure 14:
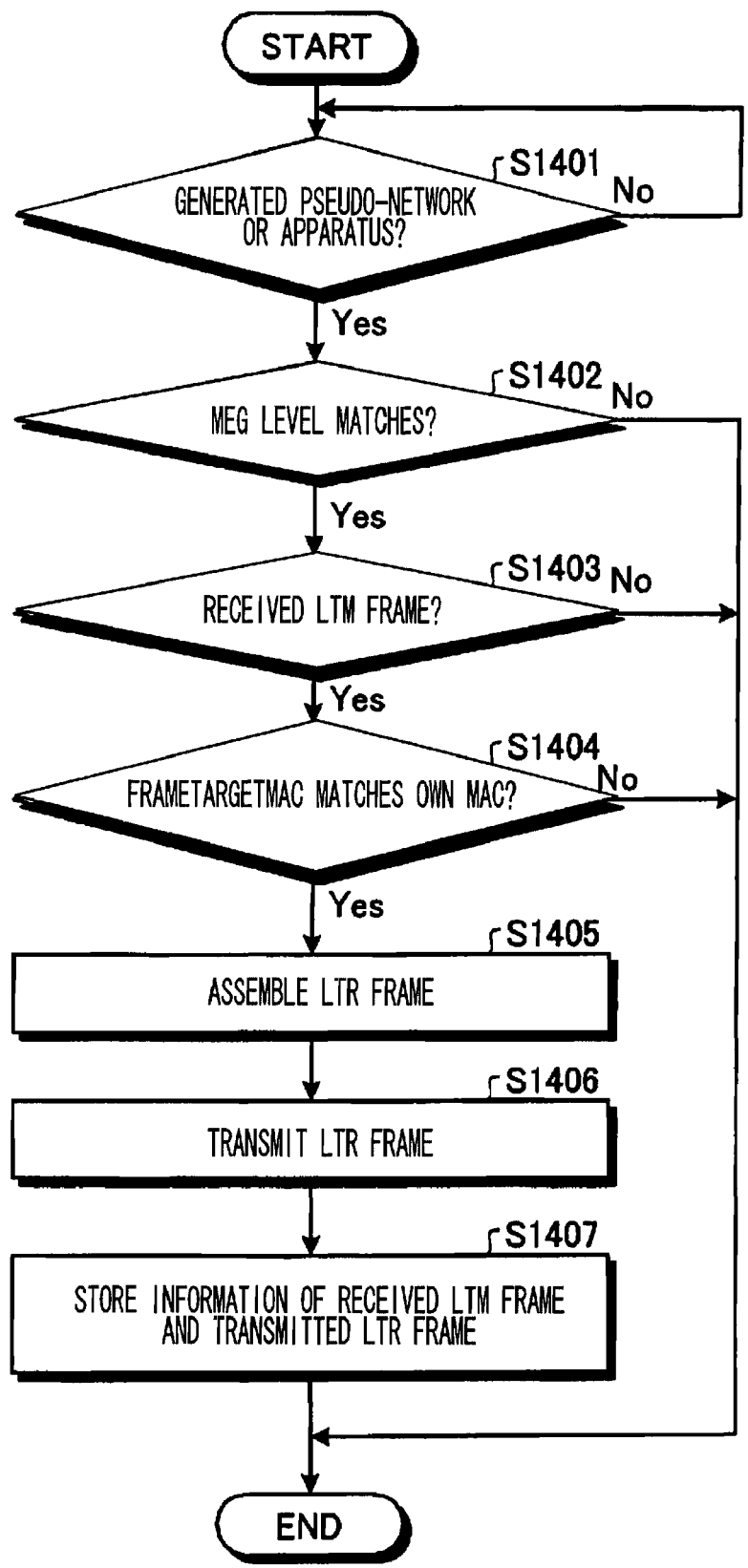
FIG. 14 is a flowchart showing the flow of processing to test the LT function in the Ethernet-OAM test apparatus according to the second embodiment.

Subsequently, a processing flow to test the LT function will be described referring to FIG. 14. FIG. 14 is a flowchart showing the flow of processing to test the LT function in the Ethernet-OAM test apparatus according to the second embodiment.

As shown in FIG. 14, when a pseudo-network or a pseudo-apparatus is generated using received configuration information (S1401:Yes), the EO protocol processing engine unit 18 determines whether or not "MEG Level" in the received OAM frame matches "MEG Level" of the network (or apparatus) generated in a pseudo manner (S1402).

In the case of matching the both "MEG Level" (S1402: Yes), the EO protocol processing engine unit 18 determines whether or not a kind of test in the relevant OAM frame indicates an LTM frame (S1403).

If the kind of test in the relevant OAM frame is an LTM (S1403:Yes), the EO protocol processing engine unit 18 determines whether or not "Frame TargetMAC" in the received OAM frame matches "Own MAC Addr" in the EO main DB 11 (S1404).

If "Frame TargetMAC" in the received OAM frame matches "Own MAC Addr" in the EO main DB 11 (S1404: Yes), the EO protocol processing engine unit 18 assembles an LTR frame to transmit a response of the received OAM frame (LTM frame) (S1405), and transmits the assembled LTR frame to an OAM frame transmitting relay apparatus (S1406).

Afterward, the EO protocol processing engine unit 18 stores the received OAM frame (LTM frame) and various information contained in the transmitted LTR frame in the LB/LT target DB 13 (S1407).

Returning to S1402, if "MEG Level" in the received OAM frame does not match "MEG Level" of the network (or apparatus) generated in a pseudo manner (S1402:No), the kind of test in the relevant OAM frame is not LTM (S1403:No), or "Frame TargetMAC" in the received OAM frame does not match "Own MAC Addr" in the EO main DB 11 (S1404:No), then the EO protocol processing engine unit 18 terminates the processing.

(Processing Flow to Test AIS Function)

Figure 15:
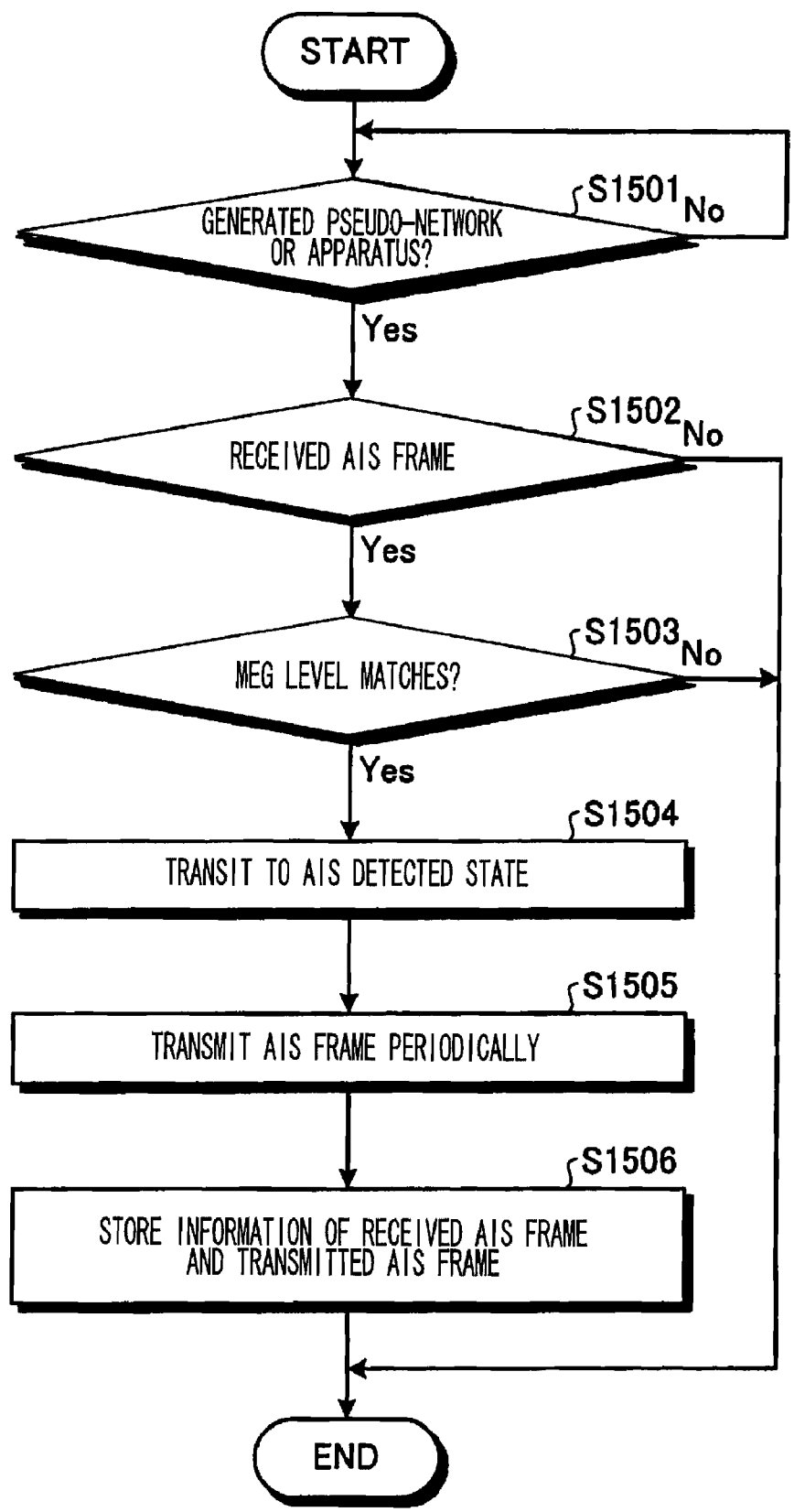
FIG. 15 is a flowchart showing the flow of processing to test the AIS function in the Ethernet-OAM test apparatus according to the second embodiment.

Subsequently, a processing flow to test the AIS function will be described referring to FIG. 15. FIG. 15 is a flowchart showing the flow of processing to test the AIS function in the Ethernet-OAM test apparatus according to the second embodiment.

As shown in FIG. 15, when a pseudo-network or a pseudo-apparatus is generated using received configuration information (S1501:Yes), the EO protocol processing engine unit 18 determines whether or not a kind of test in the relevant OAM frame indicates an AIS frame (S1502).

If the kind of test in the relevant OAM frame is an AIS (S1502:Yes), the EO protocol processing engine unit 18 determines whether or not "MEG Level" in the received OAM frame matches "MEG Level" of the network (or apparatus) generated in a pseudo manner (S1503).

In the case of matching the both "MEG Level" (S1503: Yes), the EO protocol processing engine unit 18 causes the state of the relevant Ethernet network to transit to an AIS detected state (S1504), and regularly transmits the AIS frame to other apparatuses (S1505).

Afterward, the EO protocol processing engine unit 18 stores the received OAM frame (AIS frame), and various information contained in the transmitted AIS frame in the LB/LT target DB 13 (S1506).

Returning to S1502, if the kind of test in the relevant OAM frame is not AIS (S1502:No), or "MEG Level" in the received OAM frame does not match "MEG Level" of the network (or apparatus) generated in a pseudo manner (S1503:No), then the EO protocol processing engine unit 18 terminates the processing.

(Processing Flow to Test LCK Function)

Figure 16:
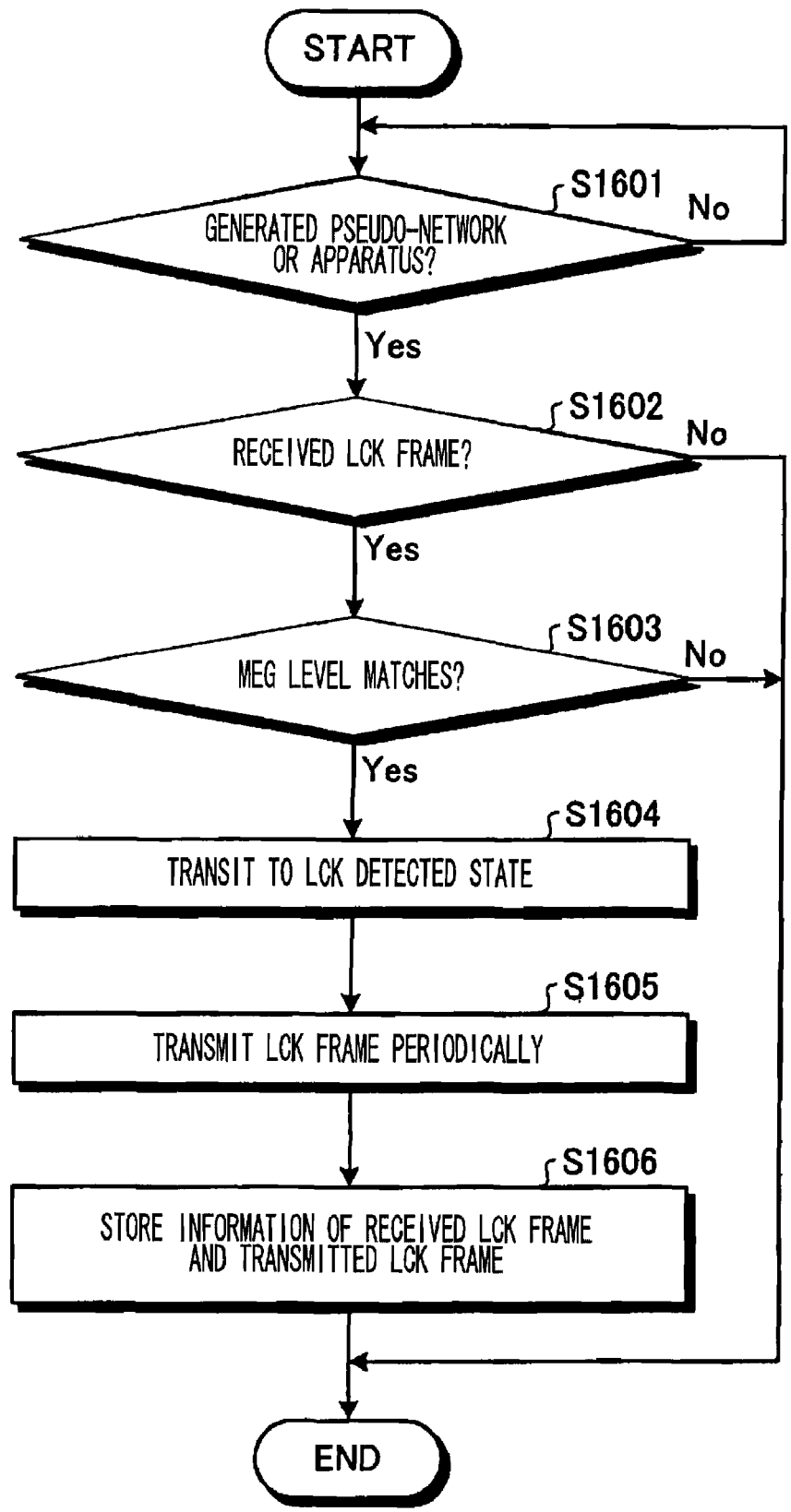
FIG. 16 is a flowchart showing the flow of processing to test the LCK function in the Ethernet-OAM test apparatus according to the second embodiment.

Subsequently, a processing flow to test the LCK function will be described referring to FIG. 16. FIG. 16 is a flowchart showing the flow of processing to test the LCK function in the Ethernet-OAM test apparatus according to the second embodiment.

As shown in FIG. 16, when a pseudo-network or a pseudo-apparatus is generated using received configuration information (S1601:Yes), the EO protocol processing engine unit 18 determines whether or not a kind of test in the relevant OAM frame indicates an LCK frame (S1602).

If the kind of test in the relevant OAM frame is an LCK (S1602:Yes), the EO protocol processing engine unit 18 determines whether or not "MEG Level" in the received OAM frame matches "MEG Level" of the network (or apparatus) generated in a pseudo manner (S1603).

In the case of matching the both "MEG Level" (S1603: Yes), the EO protocol processing engine unit 18 causes the state of the relevant Ethernet network to transit to an LCK detected state (S1604), and regularly transmits the LCK frame to other apparatuses (S1605).

Afterward, the EO protocol processing engine unit 18 stores the received OAM frame (LCK frame), and various information contained in the transmitted LCK frame in the LB/LT target DB 13 (S1606).

Returning to S1602, if a kind of test in the relevant OAM frame is not AIS (S1602:No), or "VLAN Level" in the received OAM frame does not match "VLAN Level" of the network (or apparatus) generated in a pseudo manner (S1603: No), then the EO protocol processing engine unit 18 terminates the processing.

As described in the above, according to the second embodiment, not only the CC function, but also other functions of the Ethernet-OAM protocol (for example, the LB function, LT function, AIS function, LCK function, etc.) can be similarly tested. As a result, whichever function-testing OAM frame is transmitted by a relay apparatus, any test can be conducted. Additionally, all the functions of the Ethernet-OAM protocol can be easily tested by generating a pseudo-network or relay apparatus similarly to the first embodiment.

Third Embodiment

In the first and second embodiments, a relay apparatus being a MEP is generated in a pseudo manner to conduct a test, but the embodiments are not limited to it. It is also possible to generate a relay apparatus being a MIP in a pseudo manner for the test.

In a third embodiment, conducting a test by generating a relay apparatus being a MIP in a pseudo manner will be described referring to FIGS. 17 and 18. In relation to the third embodiment, processing by the Ethernet-OAM test apparatus according to the third embodiment will be described. Processing until a pseudo-network or apparatus is generated, which is similar to that in the first embodiment, will not be described herein in detail. In relation to the third embodiment, tests of the LB function and LT function defined as MIP operation will be described.

(Processing Flow to Test LB Function)

Figure 17:
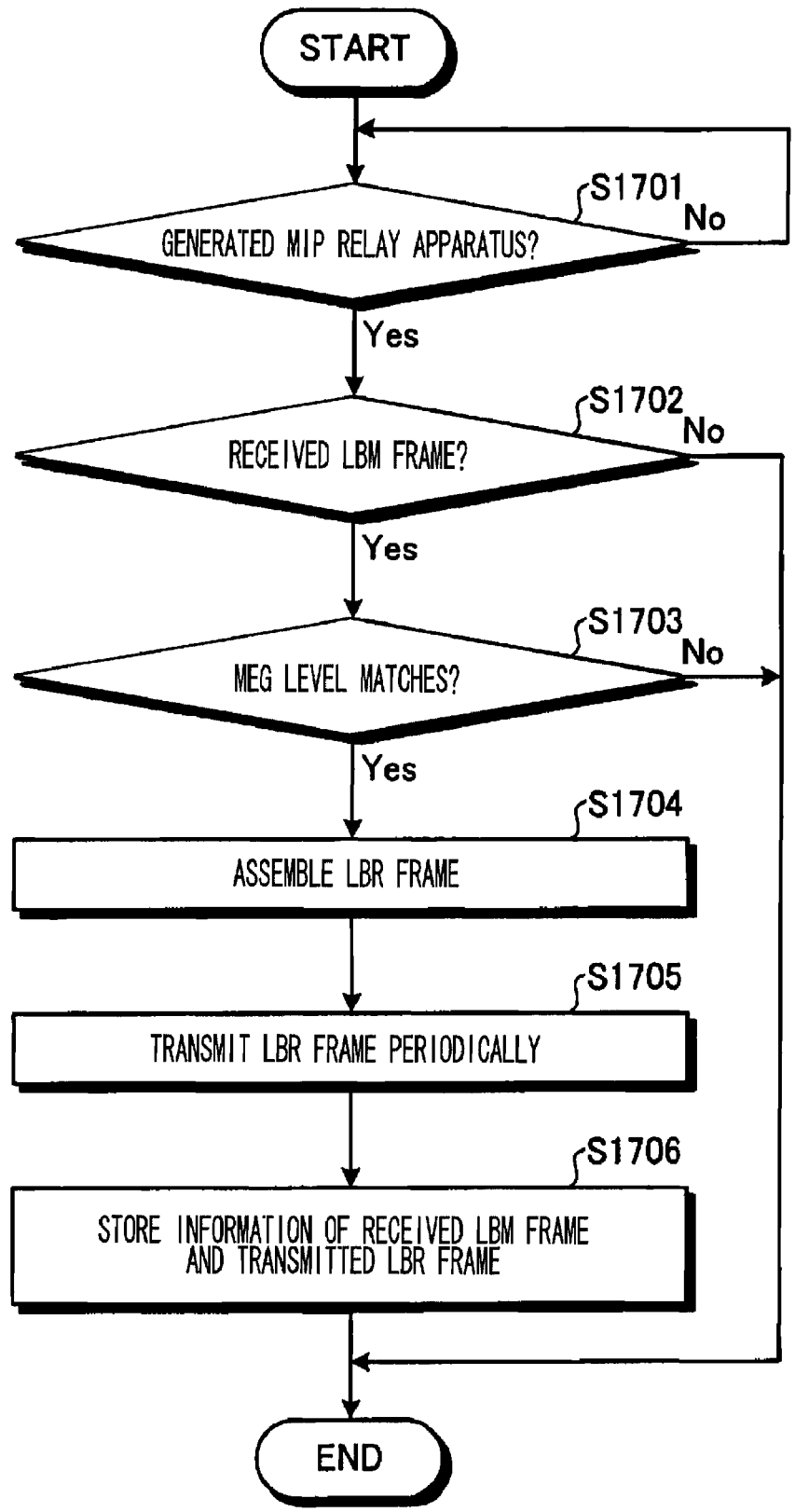
FIG. 17 is a flowchart showing the flow of processing to test the LB function in an Ethernet-OAM test apparatus according to a third embodiment.

Referring to FIG. 17, a processing flow to test the LB function will be described. FIG. 17 is a flowchart showing the flow of processing to test the LB function in the Ethernet-OAM test apparatus according to the third embodiment.

As shown in FIG. 17, when a MIP relay apparatus is generated in a pseudo manner using received configuration information (S1701:Yes), the EO protocol processing engine unit 18 determines whether or not a kind of test in the relevant OAM frame indicates an LBM frame (S1702).

If the kind of test in the relevant OAM frame is an LBM (S1702:Yes), the EO protocol processing engine unit 18 determines whether or not "MEG Level" in the received OAM frame matches "MEG Level" of the relay apparatus (MIP) generated in a pseudo manner (S1703).

In the case of matching the both "MEG Level" (S1703: Yes), the EO protocol processing engine unit 18 assembles an LBR frame to transmit a response of the received OAM frame (LBM frame) (S1704), and regularly transmits the assembled LBR frame to an OAM frame transmitting relay apparatus (S1705).

Afterward, the EO protocol processing engine unit 18 stores the received OAM frame (LBM frame), and various information contained in the transmitted LBR frame in the LB/LT target DB 13 (S1706).

Returning to S1702, if the kind of test in the relevant OAM frame is not LBM (S1702:No), or "MEG Level" in the received OAM frame does not match "MEG Level" of the relay apparatus generated in a pseudo manner (S1703:No), then the EO protocol processing engine unit 18 terminates the processing.

(Processing Flow to Test LT Function)

Figure 18:
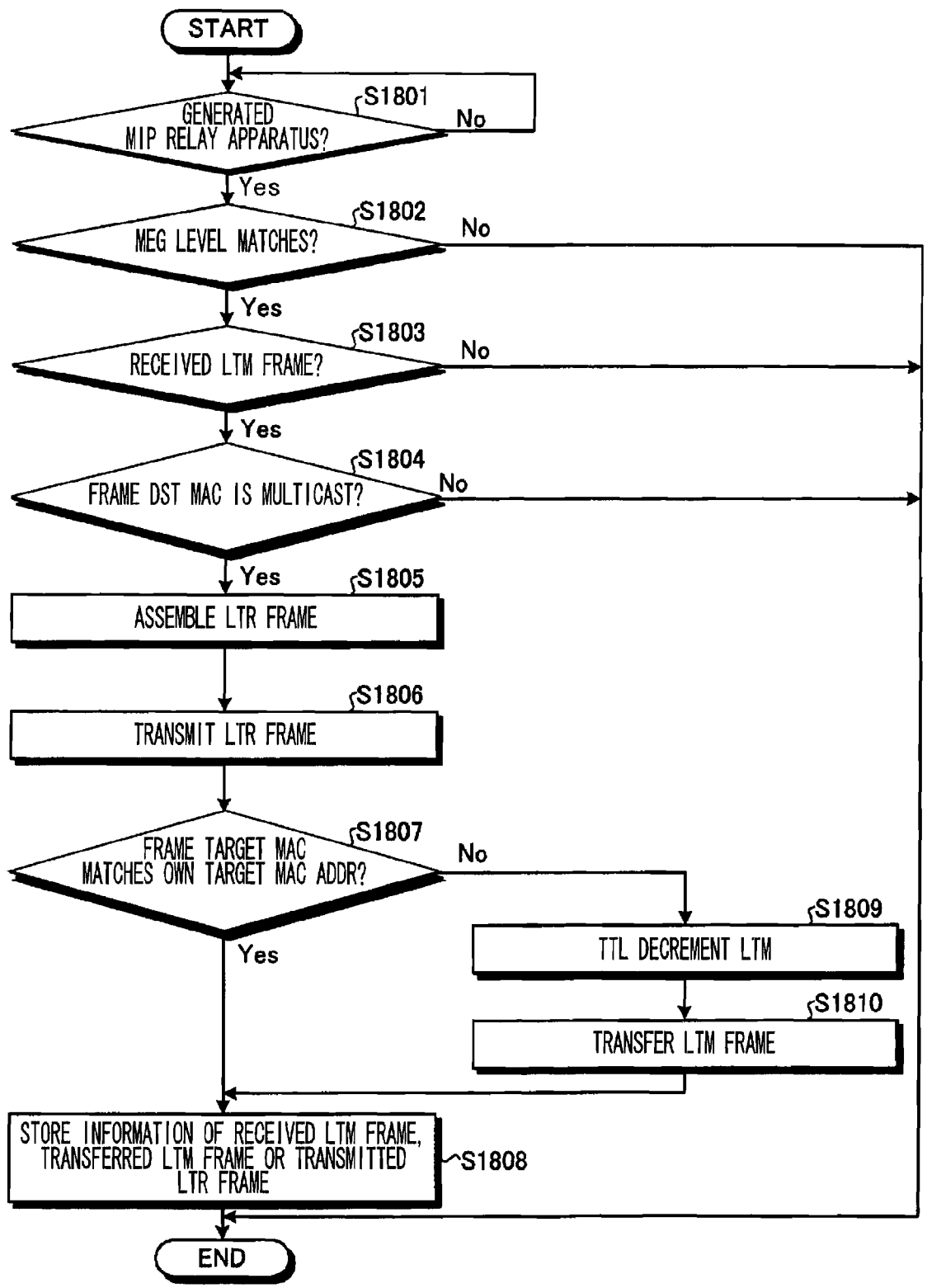
FIG. 18 is a flowchart showing the flow of processing to test the LT function in the Ethernet-OAM test apparatus according to the third embodiment.

Referring to FIG.18, a processing flow to test the LT function will be described. FIG. 18 is a flowchart showing the flow of processing to test the LT function in the Ethernet-OAM test apparatus according to the third embodiment.

As shown in FIG. 18, when a MIP relay apparatus is generated in a pseudo manner using the received configuration information (S1801:Yes), the EO protocol processing engine unit 18 determines whether or not "MEG Level" in the received OAM frame matches "MEG Level" of the relay apparatus (MIP) generated in a pseudo manner (S1802).

If "MEG Level" in the received OAM frame matches "MEG Level" of the relay apparatus (MIP) generated in a pseudo manner (S1802:Yes), the EO protocol processing engine unit 18 determines whether or not a kind of test in the relevant OAM frame is LTM (S1803).

If the kind of test in the relevant OAM frame is LTM (S1803:Yes), the EO protocol processing engine unit 18 determines whether or not "Frame Dst MAC" in the received OAM frame (LTM frame) indicates "Multicast" (S1804).

If "Frame Dst MAC" indicates "Multicast" (S1804:Yes), the EO protocol processing engine unit 18 assembles an LTR frame to transmit a response of the received OAM frame (LTM frame) (S1805). Then, the EO protocol processing engine unit 18 transmits the assembled LTR frame to an OAM frame transmitting relay apparatus (S1806).

Then, the EO protocol processing engine unit 18 determines whether or not "Frame Target MAC" in the received OAM frame (LTM frame) matches "Own MAC Addr" stored in the EO main DB 11 (S1807).

If "Frame Target MAC" matches "Own MAC Addr" stored in the EO main DB 11 (S1807:Yes), the EO protocol processing engine unit 18 stores the received OAM frame (LTM frame), and various information contained in the transmitted LTR frame in the LB/LT target DB 13 (S1808).

Otherwise, if "Frame Target MAC" does not match "Own MAC Addr" stored in the EO main DB 11 (S1807:No), other apparatuses would receive the OAM frame. Therefore, the EO protocol processing engine unit 18 decrements TTL in the received OAM frame (LTM frame) (S1809), and transfers the received LTM frame to the next apparatus connected to the Ethernet-OAM test apparatus 10 (S1810). Then, the unit 18 stores the received OAM frame (LTM frame), the transmitted LTR frame, and various information contained in the transferred LTM frame in the LB/LT target DB 13 (S1808).

Returning to S1802, if "MEG Level" in the received OAM frame does not match "MEG Level" of the relay apparatus (MIP) generated in a pseudo manner (S1802:No), the kind of test in the relevant OAM frame does not indicates an LTM frame (S1803:No), or "Frame Target MAC" in the received OAM frame does not indicate "Multicast" (S1804:No), then the EO protocol processing engine unit 18 terminates the processing.

As described in the above, according to the third embodiment, not only a terminating MEP, but also a MIP on a path can be generated in a pseudo manner for a test. As a result, the Ethernet-OAM protocol functions can be tested more correctly and precisely.

Fourth Embodiment

In the first to third embodiments, the tests conducted by receiving an OAM frame from a relay apparatus has been described, but the embodiments are not limited to it. It is also possible to conduct various tests by transmitting an OAM frame to the relay apparatus.

In relation to a fourth embodiment, conducting various tests by transmitting an OAM frame to a relay apparatus will be described referring to FIGS. 19 to 23. In relation to the fourth embodiment, a configuration and a processing flow of the Ethernet-OAM test apparatus, and effects of the embodiment will be described one by one.

Configuration of Ethernet-OAM Test Apparatus

Figure 19:
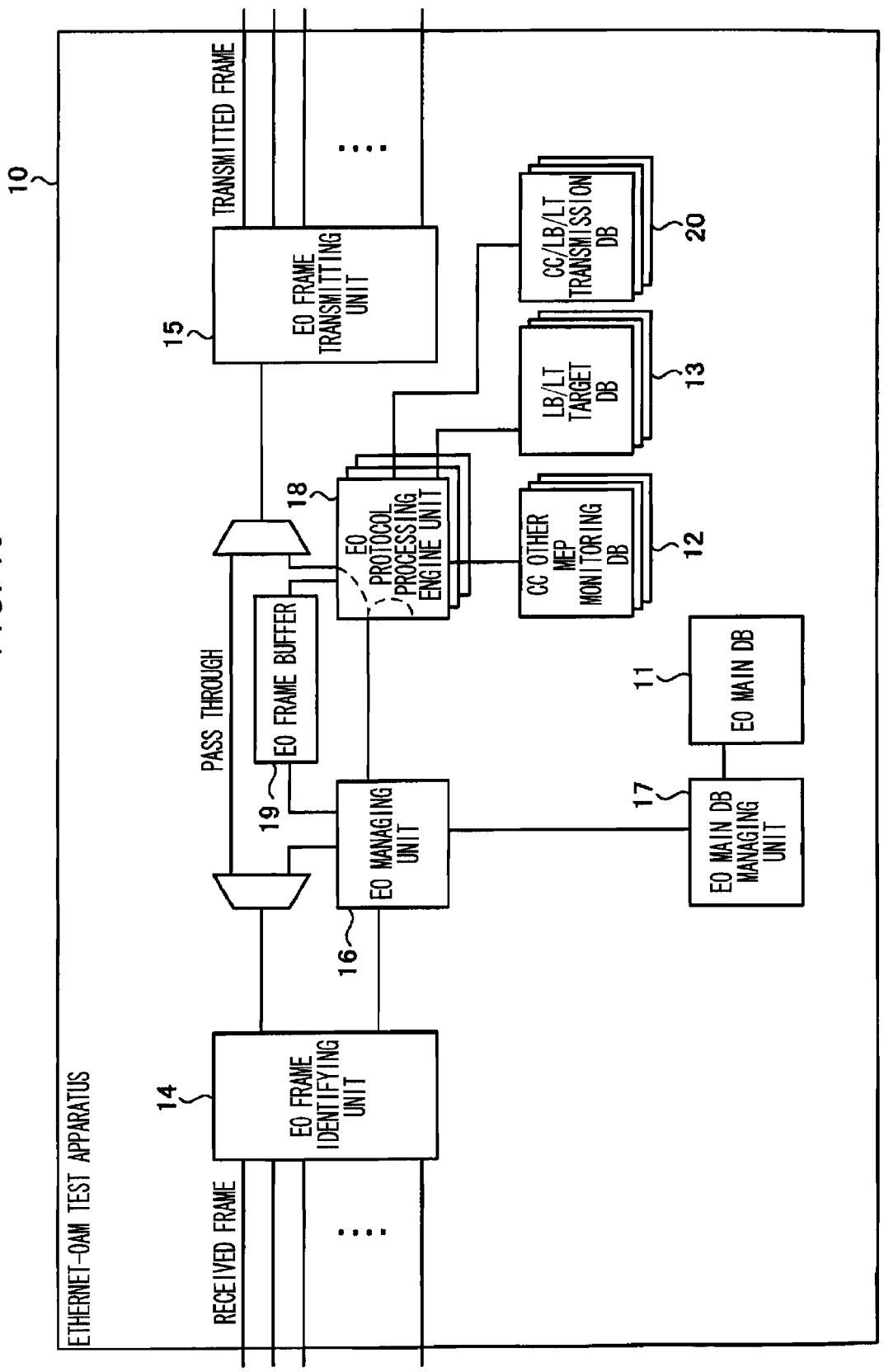
FIG. 19 is a block diagram showing a configuration of an Ethernet-OAM test apparatus according to a fourth embodiment.

FIG. 19 is a block diagram showing a configuration of the Ethernet-OAM test apparatus according to the fourth embodiment. The EO main DB 11, the CC other MEP monitoring DB 12, the LB/LT target DB 13, the EO frame identifying unit 14, the EO frame transmitting unit 15, the EO managing unit 16, the EO main DB managing unit 17, the EO protocol processing engine unit 18, and the EO frame buffer 19 as shown in FIG. 19 have functions similar to those in FIG. 2 illustrated in relation to the first embodiment. Therefore, they will not be further described herein. In relation to this embodiment, a CC/LB/LT transmission DB 20 having a different function from the first embodiment will be described.

The CC/LB/LT transmission DB 20 stores a test result gained by transmitting an OAM frame containing a kind of test to a relay apparatus and timer information to conduct the test, for example. Specifically, the EO protocol processing engine unit 18 conducts a test by transmitting an OAM frame containing a kind of test to a relay apparatus and receiving the response. Then, the EO protocol processing engine unit 18 transmits the OAM frame. When the EO protocol processing engine unit 18 receives the response, it stores information of the transmitted OAM frame and information of the received response as the test result in the CC/LB/LT transmission DB 20.

Giving an example, the CC/LB/LT transmission DB 20 separates the information into respective functions of CC transmission, LB transmission, LB response transmission, LT transmission and LT response/transfer transmission, and stores OAM frame transmission information and response reception information such as "transmission time, a regular transmission timer, last transmission time, Flag information, the number of transmissions, a reception waiting timer and the number of receptions" as information conducting the tests, as shown in FIG. 20. FIG. 20 is a diagram showing an example of information stored in the CC/LB/LT transmission DB.

Processing by Ethernet-OAM Test Apparatus
(Processing Flow to Test CC Function)

Figure 21:
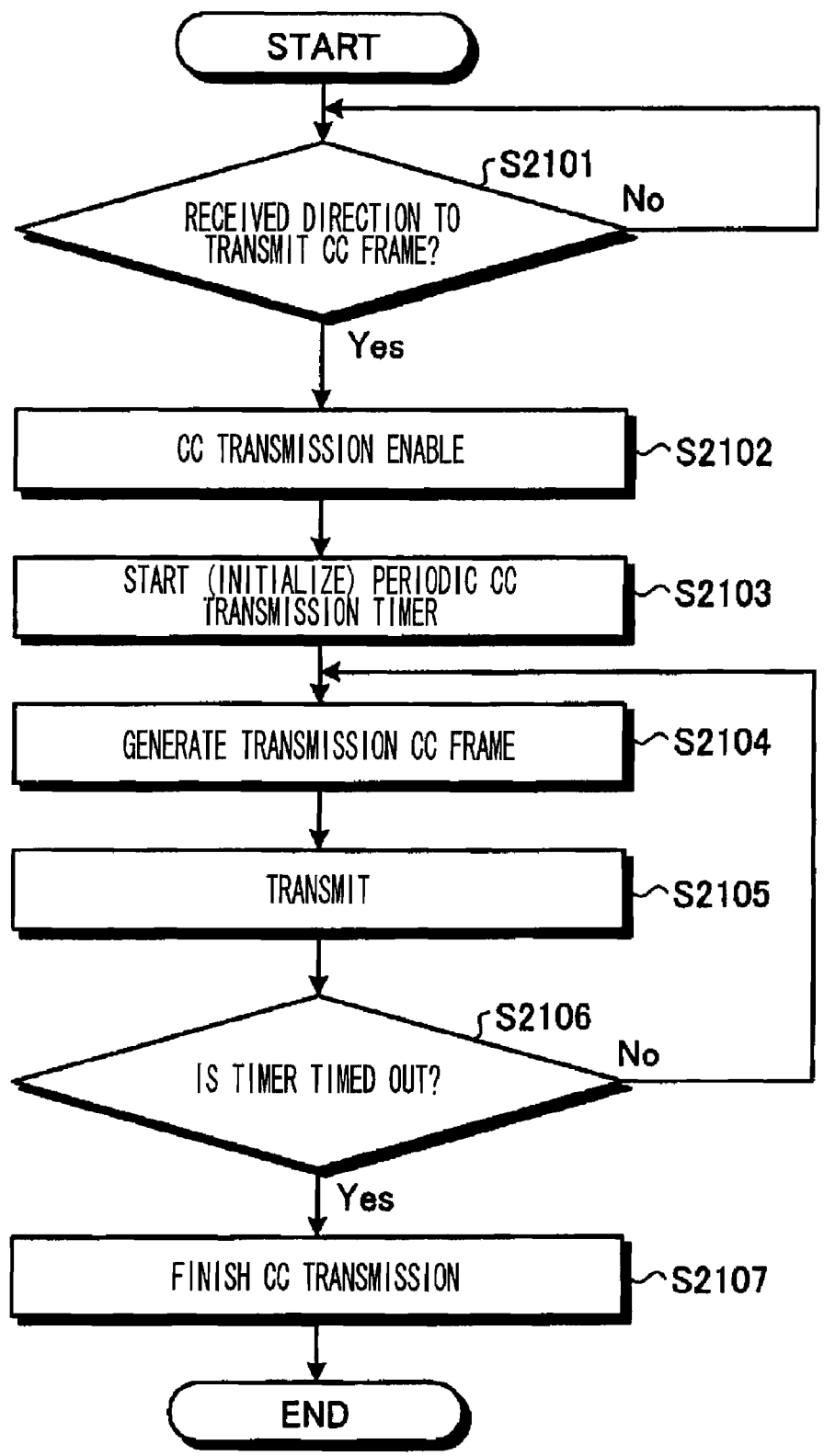
FIG. 21 is a flowchart showing the flow of processing to test the CC function by transmitting an OAM frame in the Ethernet-OAM test apparatus according to the fourth embodiment.

Referring to FIG. 21, a processing flow to test the CC function will be described. FIG. 21 is a flowchart showing the flow of processing of OAM frame transmission and a CC function test by the Ethernet-OAM test apparatus according to the fourth embodiment.

As shown in FIG. 21, when a CC frame transmission direction is received through directing operation by a user (S2101: Yes), the Ethernet-OAM test apparatus transits CC transmission being performed by the relevant test apparatus to the "Enable" state (S2102).

Then, the EO protocol processing engine unit 18 of the Ethernet-OAM test apparatus initializes a timer by starting a periodic CC transmission timer stored in the CC/LB/LT transmission DB 20 (S2103), and generates a transmission CC frame (S2104). Information of the transmitted CC frame is stored in the CC/LB/LT transmission DB 20 by the EO protocol processing engine unit 18.

Afterward, the EO protocol processing engine unit 18 regularly transmits the generated transmission CC frame to a relay apparatus being a test object (S2105).

Then, when the timer is timed out (S2106:Yes), the EO protocol processing engine unit 18 terminates the regular CC transmission (S2107).

Otherwise, if the timer is not timed out (S2106:No), the EO protocol processing engine unit 18 returns to S2104 to generate a CC frame and execute the regular CC transmission (S2105).

(Processing Flow to Test LB Function)

Figure 22:
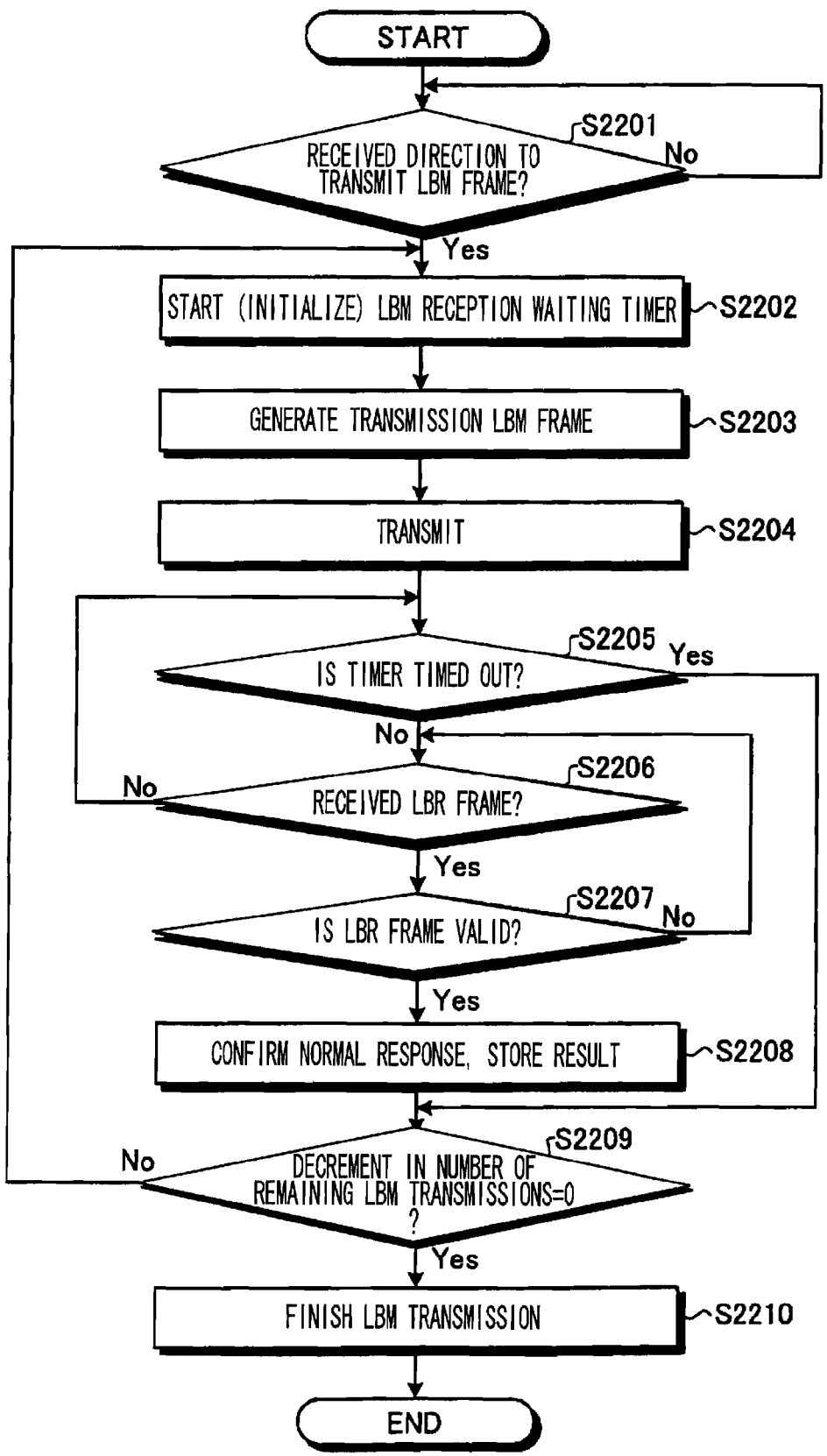
FIG. 22 is a flowchart showing the flow of processing to test the LB function by transmitting an OAM frame in the Ethernet-OAM test apparatus according to the fourth embodiment.

Referring to FIG. 22, a processing flow to test the LB function will be described. FIG. 22 is a flowchart showing the flow of processing of OAM frame transmission and an LB function test by the Ethernet-OAM test apparatus according to the fourth embodiment.

As shown in FIG. 22, when an LBM frame transmission direction is received through directing operation by a user (S2201:Yes), the EO protocol processing engine unit 18 of the Ethernet-OAM test apparatus starts and initializes an LBM reception waiting timer stored in the CC/LB/LT transmission DB 20 (S2202).

Then, the EO protocol processing engine unit 18 generates a transmission LBM frame (S2203), and transmits the generated transmission LBM frame to a relay apparatus being a test object (S2204). Information of the transmitted LBM frame is stored in the CC/LB/LT transmission DB 20 by the EO protocol processing engine unit 18.

Afterward, without the LBR reception waiting timer being timed out (S2205:No), the EO protocol processing engine unit 18 receives an LBR frame from the relevant relay apparatus (S2206:Yes). Then, the EO protocol processing engine unit 18 confirms the validity of the received LBR frame (S2207). The validity herein is determined depending on whether or not "MEG Level" and "TransactionID/SepNumber" in the received LBR frame match information of the transmitted LBM frame. That is, it is determined to be valid in the case of matching them, but it is determined to be invalid if there is no match.

If there is no problem in the validity of the received LBR frame (S2207:Yes), the EO protocol processing engine unit 18 confirms a normal response, and stores the response as the relevant test result in the CC/LB/LT transmission DB 20 (S2208). Otherwise, if there is a problem in the validity of the received LBR frame (S2208:No), the EO protocol processing engine unit 18 returns to S2206 to wait for an LBR frame to be transmitted from the relevant relay apparatus.

Subsequently, when a "decrement number" which is the number of remaining LBM transmissions is 0 (52209:Yes), the EO protocol processing engine unit 18 terminates the relevant LBM transmission processing (S2210).

Otherwise, if the decrement number is not 0 (S2209:No), the EO protocol processing engine unit 18 returns to S2202 to execute the subsequent processing. If the LBR reception waiting timer is timed out at S2205 (S2205:Yes), the Ethernet-OAM test apparatus determines whether or not the decrement number is 0 and executes the subsequent processing.

(Processing Flow to Test LT Function)

Figure 23:
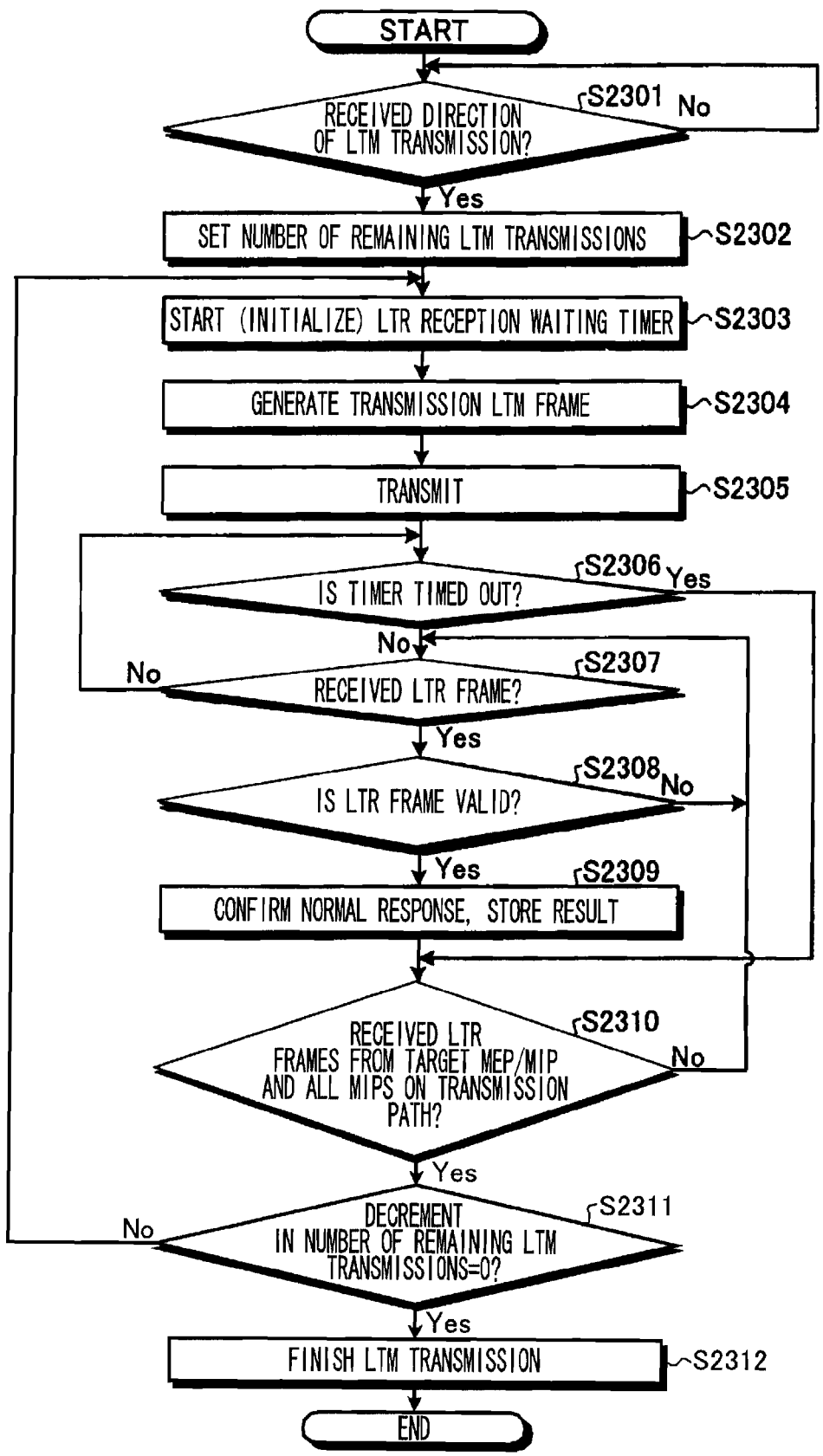
FIG. 23 is a flowchart showing the flow of processing to test the LT function by transmitting an OAM frame in the Ethernet-OAM test apparatus according to the fourth embodiment.

Referring to FIG. 23, a processing flow to test the LT function will be described. FIG. 23 is a flowchart showing the flow of the processing to test the LT function by transmitting an OAM frame by the Ethernet-OAM test apparatus according to the fourth embodiment.

As shown in FIG. 23, when an LTM frame transmission direction is received through directing operation by a user (S2301:Yes), the EO protocol processing engine unit 18 of the Ethernet-OAM test apparatus sets the number of remaining LTM transmissions in the CC/LB/LT transmission DB 20 (S2302), and starts and initializes the LTR reception waiting timer of the CC/LB/LT transmission DB 20 (S2303).

Subsequently, the EO protocol processing engine unit 18 generates a transmission LTM frame to be transmitted (S2304), and transmits the frame to a relay apparatus being a test object (S2305). Information of the transmitted LTM frame is stored in the CC/LB/LT transmission DB 20 by the EO protocol processing engine unit 18.

Afterward, without the LTR reception waiting timer being timed out (S2306:No), the EO protocol processing engine unit 18 receives the LTR frame from the relevant relay apparatus (S2307:Yes), and then confirms the validity of the received LTR frame (S2308). The validity herein is determined depending on whether or not "MEG Level" and "TransactionID" in the received LTR frame matches information of the transmitted LTR frame. That is, it is determined to be valid in the case of matching them, but it is determined to be invalid if there is no match.

If there is no problem in the validity of the received LTR frame (S2308:Yes), the EO protocol processing engine unit 18 confirms a normal response, and stores the response as the relevant test result in the CC/LB/LT transmission DB 20 (S2309). Otherwise, if there is a problem in the validity of the received LTR frame (S2308:No), the EO protocol processing engine unit 18 returns to S2307 to wait for an LTR frame to be transmitted from the relevant relay apparatus.

Subsequently, when the EO protocol processing engine unit 18 receives LTR frames from MEP/MIP being a transmission target and all MIPs on the transmission path (S2310:Yes), it determines whether or not the decrement number is 0 (S2311).

Otherwise, if the EO protocol processing engine unit 18 has not received LTR frames from the MEP/MIP being the transmission target and all the MIPs on the transmission path (S2310:No), it returns to S2307 to wait receiving the LTR frames.

When the decrement number is 0 (S2311:Yes), the EO protocol processing engine unit 18 terminates the relevant LTM transmission processing (S2312).

Otherwise, if the decrement number is not 0 (S2311:No), the EO protocol processing engine unit 18 returns to S2303 to execute the subsequent processing. If the LTR reception waiting timer is timed out at S2306 (S2306:Yes), Ethernet-OAM test apparatus determines whether or not it has received the LTR frames from the MEP/MIP being the transmission target and all the MIPs on the transmission path, and executes the subsequent processing.

Effects of Fourth Embodiment

As described in the above, according to the fourth embodiment, a new OAM frame is added with a kind of test to test whether or not a certain relay apparatus being a destination of a received OAM frame functions as a receiving apparatus and is transmitted to the relay apparatus. Then, a response to the transmitted OAM frame is received from the relay apparatus, a test result is extracted from the response to the received OAM frame, and the relevant test result is stored. This enables a test whether or not a receiving function using the Ethernet-OAM protocol functions.

For example, it can be tested whether or not a relay apparatus correctly receives an OAM frame, and whether or not it correctly responds to the received OAM frame. As a result, the all Ethernet-OAM protocol functions can be easily tested. Additionally, when a relay apparatus is a monitoring apparatus using the Ethernet-OAM protocol in an entire network, the receiving function using the Ethernet-OAM protocol can be tested for the relay apparatus. As a result, the entire network can be monitored without preparing a special monitoring apparatus.

Not only it is tested whether or not a certain relay apparatus being a destination of a received OAM frame functions as a receiving apparatus, but also it can be tested whether or not a plurality of relay apparatuses being destinations of the received OAM frame function as receiving apparatuses. This enables a simultaneous and easy test whether or not a receiving function using the Ethernet-OAM protocol functions for the plurality of relay apparatuses being multipoint-connected.

Fifth Embodiment

In relation to the first to fourth embodiments, the function of storing the test result after the test has been described, but the embodiments are not limited to them. Along with the storing of the test result, the result can be displayed.

Figure 24:
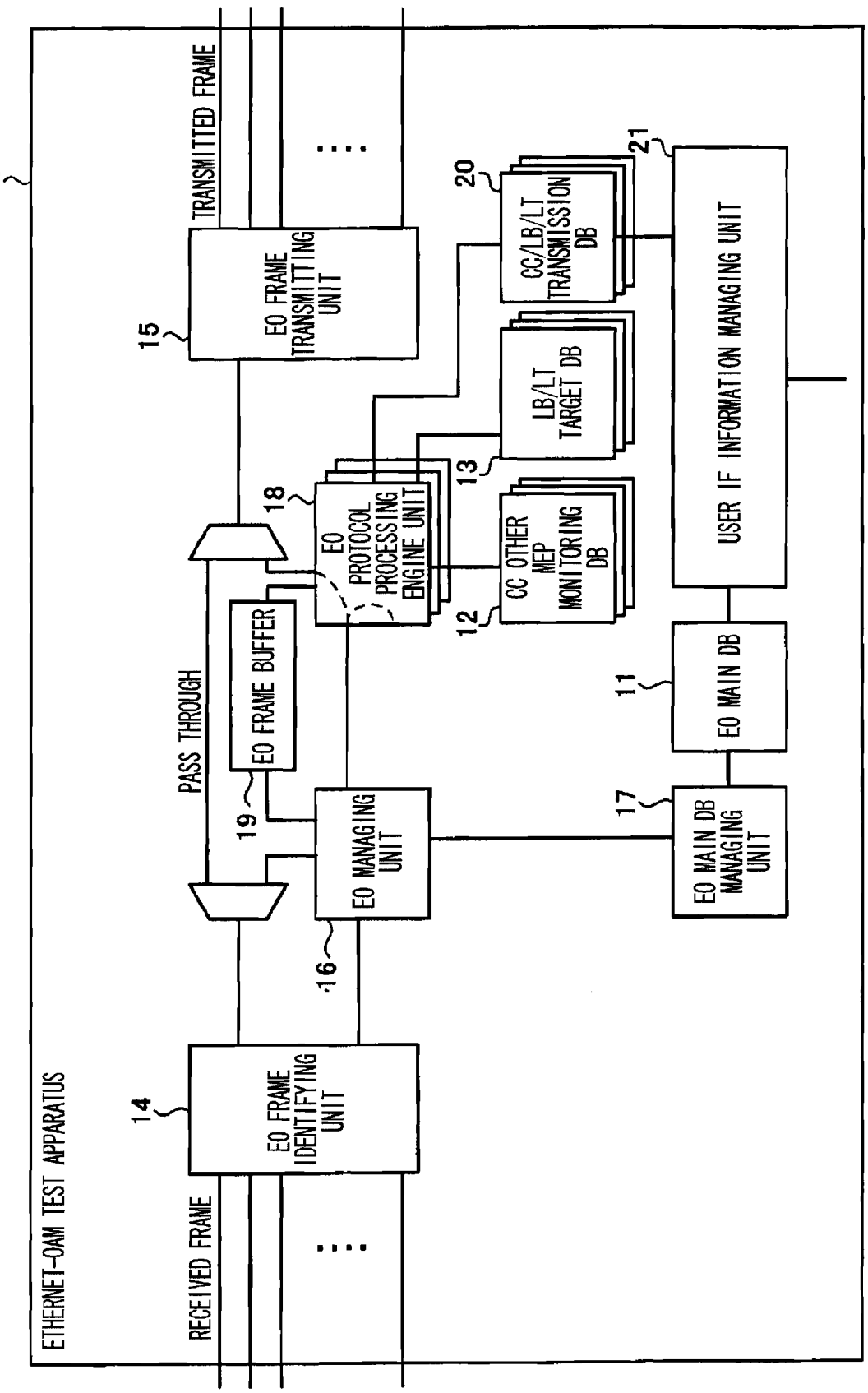
FIG. 24 is a block diagram showing a configuration of an Ethernet-OAM test apparatus according to a fifth embodiment.

In relation to a fifth embodiment, the storage and the display of a test result will be described referring to FIG. 24. FIG. 24 is a block diagram showing a configuration of the Ethernet-OAM test apparatus according to the fifth embodiment.

As shown in FIG. 24, the EO main DB 11, the CC other MEP monitoring DB 12, the LB/LT target DB 13, the EO frame identifying unit 14, the EO frame transmitting unit 15, the EO managing unit 16, the EO main DB managing unit 17, the EO protocol processing engine unit 18, the EO frame buffer 19 and the CC/LB/LT transmission DB 20 have similar functions to those in FIG. 2 illustrated in relation to the first embodiment or FIG. 19 illustrated in relation to the fourth embodiment. Therefore, they will not be described herein in detail. Herein, a user interface (I/F) information managing unit 21 will be described that has a different function from the first or fourth embodiment.

The user I/F information managing unit 21 comprises a keyboard, a mouse or a microphone for accepting various information inputs from a user and also comprises a monitor (or display, touch-sensitive panel) or a speaker for outputting various information. Giving a specific example, when the user I/F information managing unit 21 accepts a test result output direction such as from a user through a keyboard, a mouse or a microphone, it reads or retrieves various tests results stored in the CC other MEP monitoring DB 12 and the LB/LT target DB 13 and outputs them by displaying on the monitor (or display, touch-sensitive panel) or the speaker. The user I/F information managing unit 21 can not only read the various tests results stored in the CC other MEP monitoring DB 12 and the LB/LT target DB 13 and display the results, but also can transmit the read test results to other connected apparatuses via the EO frame transmitting unit 15.

As described in the above, according to the fifth embodiment, the results of the conducted tests are stored and the stored test results are displayed, thereby the test results can be appropriately notified to a user. For example, by previously defining test items to be automatically displayed, important test results of emergency can be displayed in real time. As a result, test results can be appropriately notified to a user.

Sixth Embodiment

Although some embodiments have been described, the embodiments can be carried out in any combinations thereof and/or in any different embodiments other than the embodiments described in the above, as follows. The different embodiments will be described in the sections (1) multipoint, (2) display a transmission time interval difference, (3) port setting, (4) frame capturing, (5) system configuration, etc. and (6) program, as shown below.

(1) Multipoint

For example, the first to fifth embodiments described the case in that a relay apparatus transmits an OAM frame to a single apparatus to conduct a test (P2P connection), but the embodiments are not limited to it. In the case that a relay apparatus simultaneously transmits the frame to a plurality of parties (multipoint connection), the test can be conducted similarly.

Figure 25:
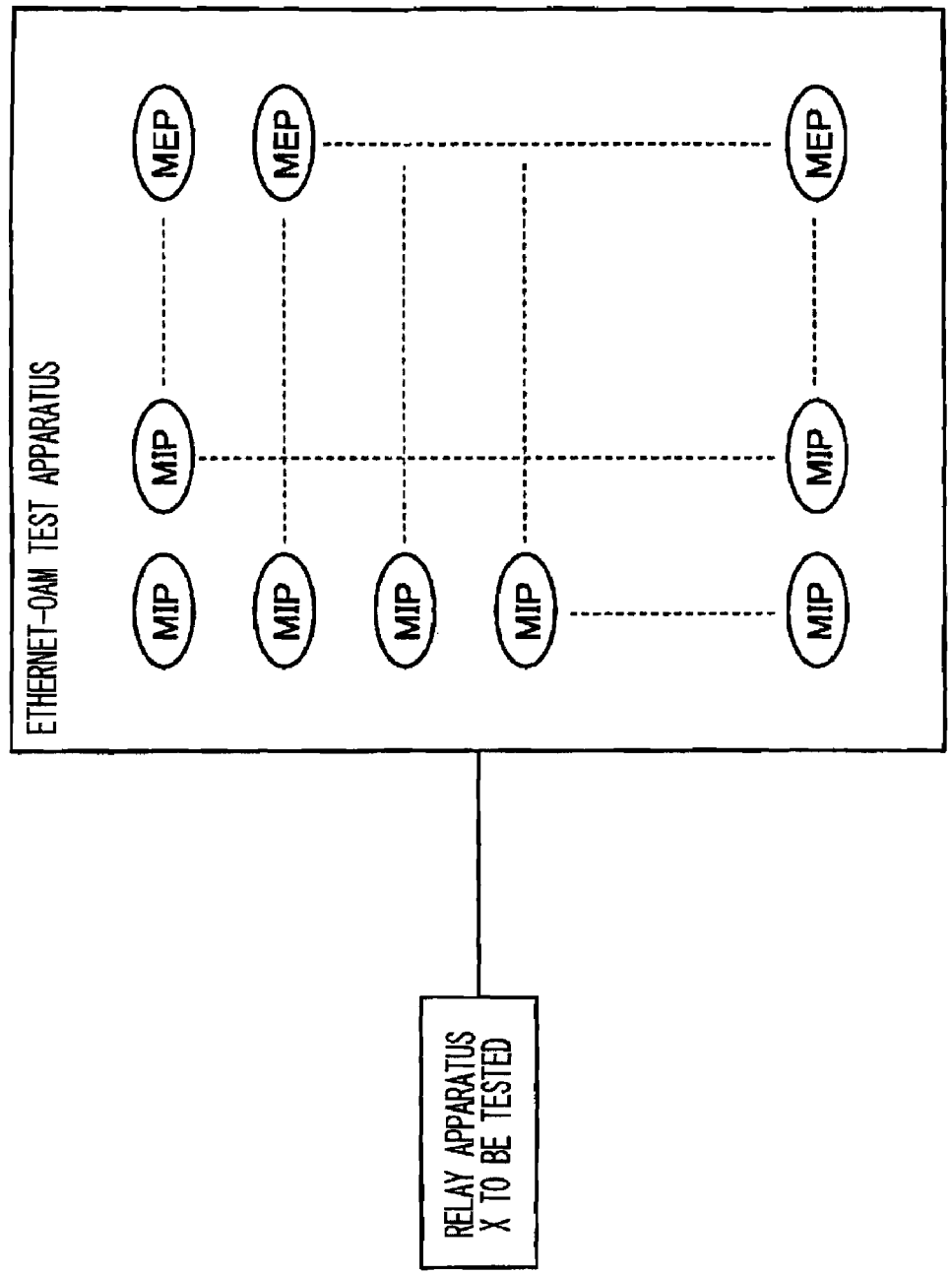
FIG. 25 is a diagram showing an example of a test conducted in a multipoint configuration.

For example, when an Ethernet-OAM test apparatus determines that a received OAM frame is simultaneously transmitted to a plurality of parties, it generates a plurality of MIPs and MEPs in a pseudo manner to generate a multipoint connection network in a pseudo manner, as shown in FIG. 25. This enables a test of the Ethernet-OAM protocol functions not only for the P2P connection, but also for the multipoint connection.

(2) Display A Transmission Time Interval Difference

According to the fifth embodiment, only the test results are displayed, but the embodiments are not limited to it. For example, the difference between a theoretical value and an actual measurement value of a transmission time interval of an OAM frame can be displayed along with the test results.

For example, when the Ethernet-OAM test apparatus receives an OAM frame from a relay apparatus, it calculates an actual measurement value of a transmission time interval of the OAM frame transmitted by the relay apparatus from the OAM frame and a plurality of OAM frames received before the OAM frame. Along with it, the test apparatus calculates a theoretical value of the transmission time interval of the OAM frame transmitted by the relay apparatus from a test result, and calculates the difference between the theoretical value and the actual measurement value. Then, the Ethernet-OAM test apparatus displays the calculated difference along with the test result. By calculating the difference between the actual measurement value and the theoretical value of the transmission time, a network state can be appropriately tested (calculated) and grasped. As a result, a correct transmission time interval of the network can be notified to a user.

(3) Port Setting

The first to fifth embodiments have described conducting a test without considering a receiving port at which the Ethernet-OAM test apparatus receives an OAM frame from a relay apparatus, and a transmitting port at which the Ethernet-OAM test apparatus transmits an OAM frame to the relay apparatus. However, the embodiments are not limited to it, but a test can also be conducted by previously setting the receiving port and the transmitting port. This enables setting an input port and an output port flexibly.

Additionally, when the Ethernet-OAM test apparatus receives an OAM frame except from a port being set, it can discard the frame by testing whether or not a port of a relay apparatus for transmitting an OAM frame has been correctly set. Furthermore, an input port and an output port can be set flexibly. As a result, it can be tested whether or not all input ports and output ports normally operate that are comprised in the Ethernet-OAM test apparatus.

(4) Frame Capturing

The apparatus according to the embodiments can also calculate a recommended monitoring cycle to monitor a relay apparatus being a test object by calculating the frame rate from an OAM frame being captured and retained, and comparing the relevant frame rate with a used line band.

For example, when an OAM frame transmitted from the relay apparatus is captured and retained if the monitoring cycle is one hour, the Ethernet-OAM test apparatus calculates the frame rate from the relevant OAM frame. If the Ethernet-OAM test apparatus determines that there is a surplus in the line band by comparing the relevant frame rate with a used line band (one Gbps), it calculates a recommended monitoring cycle (ten minutes) by shortening a monitoring cycle to monitor a relay apparatus being a test object. If it determines that there is no surplus in the line band, it calculates a recommended monitoring cycle (two hours) by lengthening the monitoring cycle to monitor a relay apparatus being a test object.

This enables consistently keeping a monitoring cycle to monitor a relay apparatus suitable for a used line band. For example, it has an effect of shortening a monitoring cycle if a long-interval monitoring cycle is set irrespective to that a high-speed line band is used. As a result, a defect that occurs in a network can be detected earlier. Additionally, if a low-speed line band is used and a short-interval monitoring cycle is set, the monitoring cycle can be lengthen. As a result, a network load can be reduced, while a defect can be monitored.

(5) System Configuration, etc.

The components of the apparatuses shown in the drawings are function conceptual, and do not need to be physically configured as shown. Specific embodiments of the apparatuses of being distributed and integrated are not limited to those as shown, but part or all of them can be configured by any units by functional or physical distribution and integration (for example, the EO managing unit and the EO main DB managing unit are integrated) depending on various loads or usages. Further, all or any part of the processing functions accomplished in the apparatuses can be realized by a CPU and a program analyzed and executed by the relevant CPU, or can be realized as hardware by wired logic (i.e., the embodiments can be implemented in software and/or computing hardware). According to an aspect of an embodiments, the pseudo-network and/or pseudo apparatus are implemented in any network device to provide a network test apparatus.

In the processing described in relation to the embodiments, part or all of the processing described as being automatically performed (for example, the processing to add a kind of test to an OAM frame, or the OAM frame receiving and transmission processing) can be performed manually. On the contrary, part or all of the processing described as being manually performed (for example, the processing to previously set a port) can be automatically performed by known methods. Additionally, the processing procedures, control procedures, specific names, and information containing various data or parameters illustrated in the above description or in the drawings (for example, FIGS. 3 to 8, FIG. 20) can be changed variously unless otherwise specified.

(6) Program

The various processing described in the above embodiments can be realized through execution of a previously prepared program by a computer system such as a personal computer or workstation. In the following, a computer system for executing a program having functions similar to those in the above embodiments will be described as another embodiment.

Figure 26:
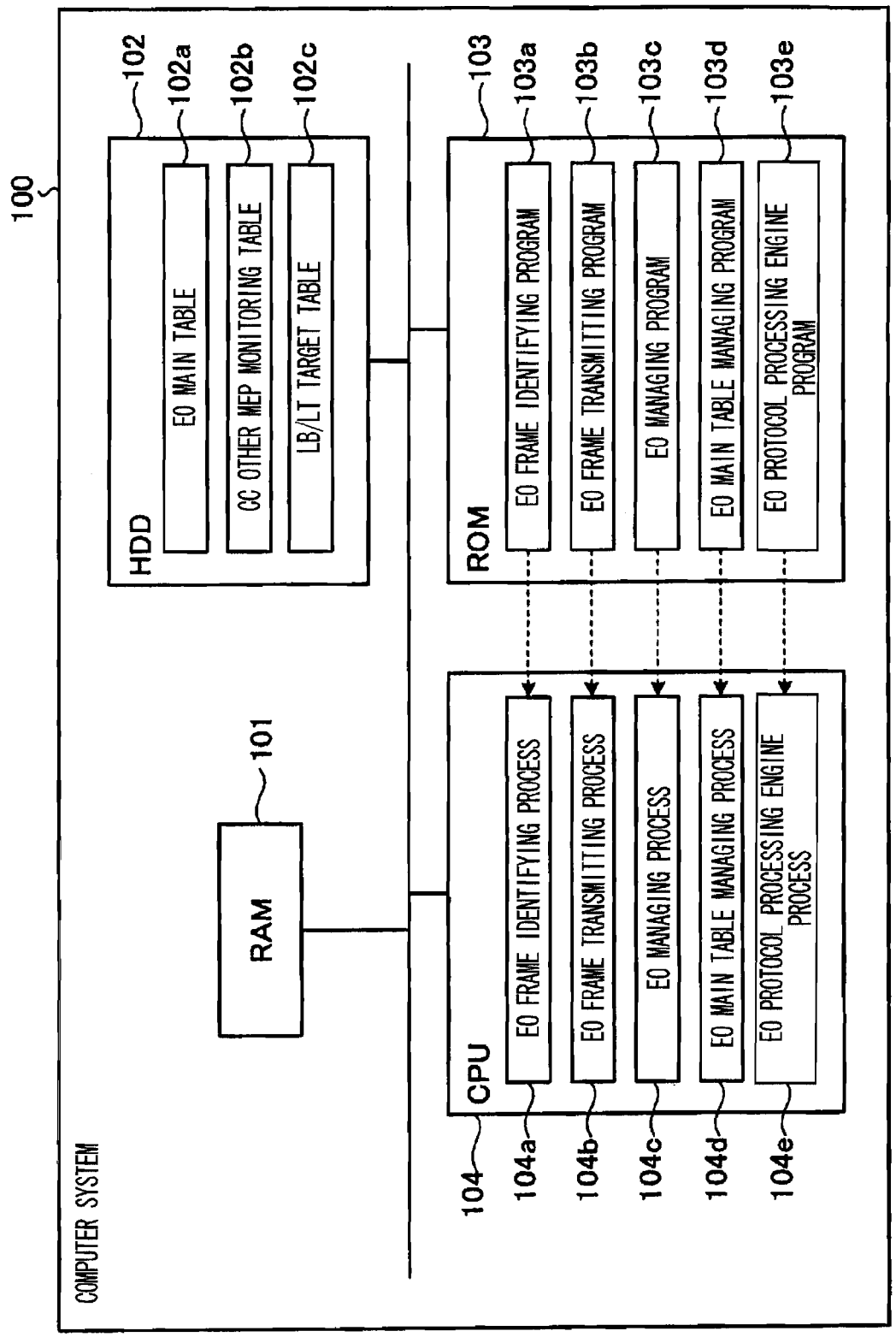
FIG. 26 is a diagram showing an example of a computer system for executing a network test program.
Figure 27:
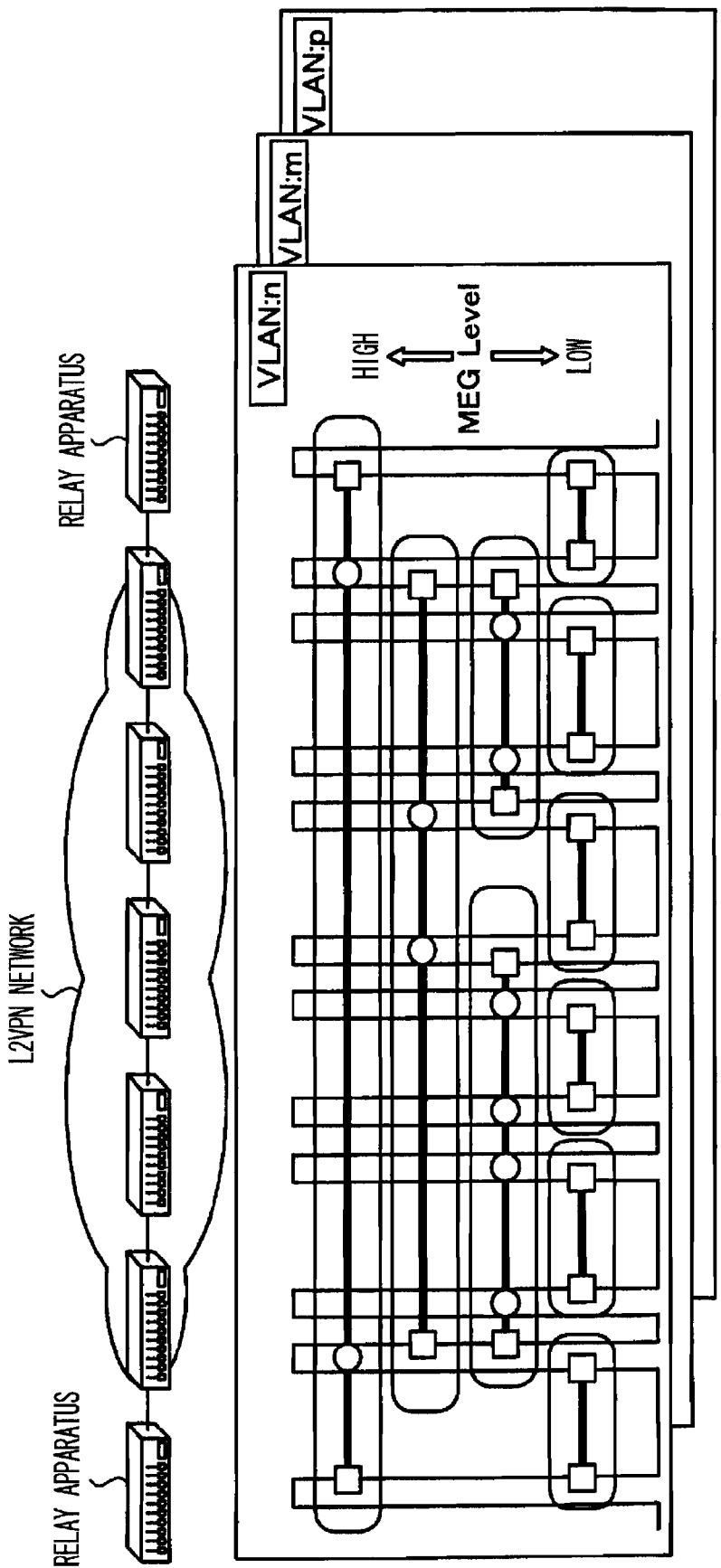
FIG. 27 is a diagram illustrating the prior art.

FIG. 26 is a diagram showing an example of a computer system for executing a network test program. As shown in FIG. 26, a computer system 100 comprises a RAM 101, an HDD 102, a ROM 103 and a CPU 104. The ROM 103 previously stores programs to exhibit functions similar to those in the above embodiments, i.e., an EO frame identifying program 103a, an EO frame transmitting program 103b, an EO managing program 103c, an EO main table managing program 103d and an EO protocol processing engine program 103e, as shown in FIG. 26.

The CPU 104 reads out and executes the programs 103a to 103e. The programs turn to an EO frame identifying process 104a, an EO frame transmitting process 104b, an EO managing process 104c, an EO main table managing process 104d and an EO protocol processing engine process 104e, as shown in FIG. 26. The EO frame identifying process 104a corresponds to the EO frame identifying unit 14 as shown in FIG. 2. Similarly, the EO frame transmitting process 104b corresponds to the EO frame transmitting unit 15. The EO managing process 104c corresponds to the EO managing unit 16. The EO main table managing process 104d corresponds to the EO main table managing unit 17. The EO protocol processing engine process 104e corresponds to the EO protocol processing engine unit 18.

The HDD 102 records an EO main table 102a for storing configuration information to generate network configurations required for a plurality of tests in a pseudo manner, a CC other MEP monitoring table 102b for storing test results of the CC function test, and an LB/LT target table 102c for storing test results of the LB/LT function test. The EO main table 102a corresponds to the EO main DB 11 as shown in FIG. 2. The CC other MEP monitoring table 102b corresponds to the CC other MEP monitoring DB 12. The LB/LT target table 102c corresponds to the LB/LT target DB 13.

The above programs 103a to 103e do not need to be stored in the ROM 103. For example, they can be stored in a "portable physical medium" such as a flexible disc (FD), CD-ROM, MO disc, DVD disc, optical-magneto disc, or IC card inserted to the computer system 100, and "other computer systems" connected to the computer system 100 via a "fixed physical medium" such as a hard disk drive (HDD) comprised in the inside or outside of the computer system 100, public line, Internet, LAN or WAN. In that case, the computer system 100 can read out the programs from those for execution of the programs.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A network test apparatus connected to a relay apparatus, comprising:

a transmitting/receiving unit transmitting/receiving to/from a relay apparatus an OAM frame containing one or more kinds of tests to test Ethernet-OAM conformance of the relay apparatus;

a configuration information storage unit storing configuration information to generate, in a pseudo manner, a pseudo network configuration needed for each of the kinds of tests;

a kind distinguishing unit, distinguishing a kind of test contained in the OAM frame and obtaining network information of a network to which the relay apparatus that transmitted the OAM frame belongs, when the OAM frame is received from the relay apparatus;

a test conducting unit generating, in a pseudo manner, a pseudo network configuration including a pseudo network and/or a pseudo network apparatus according to the OAM frame received from the relay apparatus and conducting a test for Ethernet-OAM conformance of the relay apparatus on the generated pseudo network configuration corresponding to the kind of test, based upon the configuration information corresponding to the kind of test; and a test result storing unit storing a result of the test conducted by the test conducting unit.

2. The network test apparatus according to claim 1, wherein the test conducting unit:

adds to a new OAM frame a kind of test testing whether other relay apparatus being a certain destination of an OAM frame received by the kind distinguishing unit functions as a receiving apparatus and transmits a test result to the relay apparatus; and receives a response to the transmitted new OAM frame from the other relay apparatus.

3. The network test apparatus according to claim 1, wherein the test result storing unit:
  extracts a test result from a response to the OAM frame received by the test conducting unit; and
  stores the extracted test result in the test result storing unit.

4. The network test apparatus according to claim 1, wherein the test conducting unit:
  adds to a new OAM frame a kind of test testing whether other relay apparatuses being a plurality of destinations of an OAM frame received by the kind distinguishing unit function as receiving apparatuses and transmits a test result to the relay apparatus; and
  receives responses to the transmitted new OAM frame from the other relay apparatuses.

5. The network test apparatus according to claim 1, wherein:
  the test result storing unit:
    extracts the test result from the response to the OAM frame received by the test conducting unit; and
    stores the relevant test result in a pre-determined test result storage unit.

6. The network test apparatus according to claim 1, wherein a received OAM frame to be transmitted to a certain party contains a kind of test to conduct a test.

7. The network test apparatus according to claim 6, wherein the kind distinguishing unit distinguishes a kind of test contained in the received OAM frame to be transmitted to the certain party, and obtains network information about a network to which a relay apparatus that transmitted the received OAM frame belongs.

8. The network test apparatus according to claim 7, wherein the test conducting unit obtains configuration information corresponding to the network information obtained by the kind distinguishing unit from the configuration information storage unit and conducts a test corresponding to the kind of test distinguished by the kind distinguishing unit using the obtained configuration information.

9. The network test apparatus according to claim 1, wherein a received OAM frame to be simultaneously transmitted to a plurality of parties contains a kind of test to conduct a test.

10. The network test apparatus according to claim 9, wherein the kind distinguishing unit distinguishes a kind of test contained in the received OAM frame to be simultaneously transmitted to the plurality of parties, and obtains network information about a network to which a relay apparatus that transmitted the received OAM frame belongs.

11. The network test apparatus according to claim 1, wherein the configuration information storage unit stores a delay time indicating a delay of time to transmit a received OAM frame, and loss information to lose a received OAM frame.

12. The network test apparatus according to claim 11, wherein when the kind distinguishing unit receives the OAM frame, if the configuration information storage unit stores the delay time, the test conducting unit receives the OAM frame by delaying receipt of the OAM frame by the delay time, and does not receive the OAM frame if the configuration information storage unit stores the loss information.

13. The network test apparatus according to claim 1, wherein the configuration information storage unit further stores an output port to transmit a response to a received OAM frame associated with an input port to receive the OAM frame.

14. The network test apparatus according to claim 13, wherein the test conducting unit, if the kind distinguishing unit receives the OAM frame and transmits a response to the received OAM frame, obtains the input port that received the OAM frame and the output port corresponding to the input port from the configuration information storage unit and transmits the response to the received OAM frame from the obtained output port.

15. The network test apparatus according to claim 1, further comprising:
  an actual measurement value calculating unit calculating an actual measurement value of a transmission time interval of an OAM frame transmitted by the relay apparatus, from a received OAM frame and a plurality of prior received OAM frames, when the OAM frame is received from the relay apparatus being a test object; and
  a difference calculating unit calculating a theoretical value of a transmission time interval of the OAM frame transmitted by the relay apparatus from the test result stored in the test result storing unit, and calculating a difference between the actual measurement value and the theoretical value.

16. The network test apparatus according to claim 1 further comprising a frame retaining unit capturing and retaining an OAM frame transmitted from the relay apparatus.

17. The network test apparatus according to claim 16 wherein the test conducting unit conducts the test and calculates a frame rate from an OAM frame retained in the frame retaining unit, and compares the frame rate with a used line band to calculate a recommended monitoring cycle to monitor the relay apparatus being a test object.

18. A network test method comprising:
  communicably connecting to a relay apparatus being a test object;
  transmitting/receiving to/from a relay apparatus an OAM frame containing one or more kinds of tests to test Ethernet-OAM conformance of the relay apparatus;
  storing network configuration information;
  if an OAM frame is received from the relay apparatus being the test object, distinguishing a kind of test contained in the received OAM frame;
  obtaining network information of a network to which the relay apparatus that transmitted the OAM frame belongs, based upon the received OAM frame;
  obtaining network configuration information corresponding to the obtained network information, from the stored network configuration information;
  generating, in a pseudo manner, a pseudo network configuration including a pseudo network and/or a pseudo network apparatus according to the OAM frame received from the relay apparatus and conducting a test for Ethernet-OAM conformance of the relay apparatus on the generated pseudo network configuration corresponding to the kind of test, based upon the obtained network configuration information; and
  storing a result of the test.

19. A non-transitory computer readable storage medium storing a network test program for controlling an apparatus according to operations comprising:
  communicably connecting to a relay apparatus being a test object;
  transmitting/receiving to/from a relay apparatus an OAM frame containing one or more kinds of tests to test Ethernet-OAM conformance of the relay apparatus;
  storing network configuration information;
  if an OAM frame is received from the relay apparatus being a test object, distinguishing a kind of test contained in the received OAM frame;

obtaining network information of a network to which the relay apparatus that transmitted the OAM frame belongs, based upon the received OAM frame;

obtaining network configuration information corresponding to the obtained network information, from the stored network configuration information;

generating, in a pseudo manner, a pseudo network configuration including a pseudo network and/or a pseudo network apparatus according to the OAM frame received from the relay apparatus and conducting a test for Ethernet-OAM conformance of the relay apparatus on the generated pseudo network configuration corresponding to the kind of test, based upon the obtained network configuration; and storing a result of the test.

20. An apparatus configured for network communication with a relay apparatus, comprising:

a controller configured for:

communicably connecting to the relay apparatus as a test object;

transmitting/receiving to/from a relay apparatus an OAM frame containing one or more kinds of tests to test Ethernet-OAM conformance of the relay apparatus;

storing network configuration information;

distinguishing a kind of test contained in a received OAM frame;

obtaining network information of a network to which the relay apparatus that transmitted the OAM frame belongs, based upon the received OAM frame;

obtaining network configuration information corresponding to the obtained network information, from the stored network configuration information;

generating a pseudo network configuration including a pseudo network and/or pseudo network apparatus according to the OAM frame received from the relay apparatus, based upon the obtained network configuration information; and conducting a test for Ethernet-OAM conformance of the relay apparatus on the generated pseudo network configuration corresponding to the kind of test.

* * * * *